United States Patent
Santoro et al.

(10) Patent No.: US 10,784,548 B2
(45) Date of Patent: Sep. 22, 2020

(54) BIOLOGICAL AND STAND-ALONE SUPER-CAPACITORS FOR WATER TREATMENT

(71) Applicants: STC.UNM, Albuquerque, NM (US); Carlo Santoro, Albuquerque, NM (US); Alexey Serov, Albuquerque, NM (US); Plamen B. Atanassov, Santa Fe, NM (US); Francesca Soavi, Bologna (IT); Catia Arbizzani, Bologna (IT)

(72) Inventors: Carlo Santoro, Albuquerque, NM (US); Alexey Serov, Albuquerque, NM (US); Plamen B. Atanassov, Santa Fe, NM (US); Francesca Soavi, Bologna (IT); Catia Arbizzani, Bologna (IT)

(73) Assignees: STC.UNM, Albuquerque, NM (US); Alma Mater Studiorum'Università di Bologna, Bologna (IT)

( * ) Notice: Subject to any disclaimer, the term of this patent is extended or adjusted under 35 U.S.C. 154(b) by 25 days.

(21) Appl. No.: 15/571,089

(22) PCT Filed: May 2, 2016

(86) PCT No.: PCT/US2016/030366
§ 371 (c)(1),
(2) Date: Nov. 1, 2017

(87) PCT Pub. No.: WO2016/179068
PCT Pub. Date: Nov. 10, 2016

(65) Prior Publication Data
US 2018/0166760 A1    Jun. 14, 2018

Related U.S. Application Data

(60) Provisional application No. 62/155,636, filed on May 1, 2015.

(51) Int. Cl.
H01M 16/00 (2006.01)
H01M 8/16 (2006.01)
(Continued)

(52) U.S. Cl.
CPC ......... *H01M 16/003* (2013.01); *C02F 1/4672* (2013.01); *C02F 1/4691* (2013.01);
(Continued)

(58) Field of Classification Search
None
See application file for complete search history.

(56) References Cited

U.S. PATENT DOCUMENTS

2011/0311887 A1* 12/2011 He .......................... C02F 3/005
429/401

FOREIGN PATENT DOCUMENTS

CN        1034011008 A  * 11/2013

* cited by examiner

*Primary Examiner* — Daniel S Gatewood
(74) *Attorney, Agent, or Firm* — Gonzales Patent Services; Ellen Gonzales

(57) ABSTRACT

Supercapacitive bioelectrical systems (SC-BESs) wherein the anode and cathode act as electrodes for a self-powered internal supercapacitor. The BES may further be enhanced by the use of optimized catalysts and enzymes to increase cell voltage and the use of a third capacitive electrode (AdE) short-circuited to the BES cathode and coupled to the BES anode to improve the power output of the self-powered internal supercapacitor.

10 Claims, 25 Drawing Sheets

(51) Int. Cl.

| | |
|---|---|
| *C02F 1/467* | (2006.01) |
| *C02F 1/469* | (2006.01) |
| *C02F 3/00* | (2006.01) |
| *H01M 4/90* | (2006.01) |
| *C02F 1/461* | (2006.01) |
| *H01G 11/02* | (2013.01) |
| *H01G 11/08* | (2013.01) |
| *H01G 11/10* | (2013.01) |
| *H01G 11/32* | (2013.01) |
| *H01G 11/34* | (2013.01) |
| *H01M 4/86* | (2006.01) |
| *H01M 4/96* | (2006.01) |
| *C02F 1/46* | (2006.01) |

(52) U.S. Cl.
CPC ........ *C02F 1/4693* (2013.01); *C02F 1/46109* (2013.01); *C02F 3/005* (2013.01); *H01G 11/02* (2013.01); *H01G 11/08* (2013.01); *H01G 11/10* (2013.01); *H01G 11/32* (2013.01); *H01G 11/34* (2013.01); *H01M 4/8652* (2013.01); *H01M 4/9008* (2013.01); *H01M 4/9041* (2013.01); *H01M 4/96* (2013.01); *H01M 8/16* (2013.01); *C02F 1/4604* (2013.01); *C02F 2001/46142* (2013.01); *Y02E 60/527* (2013.01)

BIOLOGICAL AND STAND-ALONE SUPER-CAPACITORS FOR WATER TREATMENT

CROSS-REFERENCE TO RELATED APPLICATIONS

The following application claims benefit of U.S. Provisional Application No. 62/155,636, filed May 1, 2015, which is hereby incorporated by reference in its entirety.

BACKGROUND

Bioelectrochemical systems (BESs) have been studied by scientists all over the world for their various applications in bioenergy and biomass degradation or recovery. The two most interesting and investigated BESs are Microbial Fuel Cells (MFCs) and Microbial Electrolysis Cells (MECs). Both systems incorporate electroactive bacteria as part of at least one electrode, and thus typically work at room temperature and at neutral pH. Moreover, both systems typically utilize biomass as the anodic fuel.

In an MFC, the electroactive bacteria degrade the organics of the anodic liquid fuel by an electrochemical oxidation. The anode semi-cell is coupled to a cathode compartment where electrochemical reduction of oxygen (from air) takes places. The result is a net flow of electrons which are directed through an external circuit to generate current/power. In traditional MFCs, the anode is typically formed of carbonaceous and/or non-carbonaceous materials that accommodate electroactive bacteria that degrade organics typically found in waste and/or salt water and transfer electrons through an external load. The cathode is typically formed from a combination of carbonaceous materials, platinum and/or platinum-free based materials, enzymes, and microbes. These combined materials work as catalysts or co-catalysts for the oxygen reduction reaction (ORR), resulting in an environmentally friendly and efficient biomass energy conversion. However, traditional MFCs generate current/power at a rate that is over 3 orders of magnitude lower than that of traditional hydrogen or methanol fuel cells and thus are generally considered impractical for most real world applications. This lower performance is due to a number of factors, including the fact that platinum which is an excellent catalyst in clean working conditions and low pH environments does not perform well in the harsh environment provided by a biomass-rich anodic fuel, contaminants or the neutral pH conditions required by MFCs.

Attempts to overcome the limitations of MFCs include the use of an external supercapacitor such as a commercial electrochemical double layer capacitor (EDLC) connected externally to an MFC. Supercapacitors are electrochemical energy storage systems which deliver high specific power (up to 10 kW $kg^{-1}$) at energy levels that are typically lower than those of batteries (up to 5-10 Wh $kg^{-1}$). EDLCs use high surface area carbon electrodes that store/deliver charge by an intrinsically fast and highly reversible electrostatic process. In use, external EDLCs store energy generated by MFCs and then deliver the stored energy as a high power output. This combination has successfully powered a variety of small electronic devices including sensors, a mobile phone, robotics prototypes, and the pump required to manage wastewater flow in an MFC. However, the low current production of MFCs (on the orders of $\mu A$) results in substantial recharging times (on the order of several minutes to several hours depending on the power requirements of the connected device) for the external commercial EDLCs, resulting in any device connected to the MFC possibly suffering from long standby times between charges.

MECs are structured very similarly to MFCs. However, in an MEC, an external power supply is generally connected to the cell to create the right potential to drive a hydrogen evolution reaction (HER) at the cathode. Consequently, in an MEC, organics are also degraded and hydrogen is produced, but the energy balance is negative. Like MFCs, MECs also suffer from substantially lower performance than their non-bioelectrochemical counterparts.

Accordingly, novel designs for BESs like MFCs and MECs that enable higher levels of energy production and which can reduce or eliminate standby times are greatly desired.

SUMMARY

The present disclosure provides a novel bioelectrical system (BES) wherein the anode and cathode act as electrodes for a self-powered internal supercapacitor. The BES may further be enhanced by the use of optimized catalysts and enzymes to increase cell voltage and the use of a third capacitive electrode, also referred to as an "additional electrode" (AdE) short-circuited to the BES cathode and coupled to the BES anode to improve the power output of the self-powered internal supercapacitor.

BRIEF DESCRIPTION OF THE DRAWINGS

FIG. 7 D is a graph of the electrode potential of SC-MFCs and SC-MFC-AdCEs of the present disclosure with Fe-AAPyr cathodes under 5 s rest and 2 s pulses at 3 mA.

FIG. 7 E is a graph of cell voltage profiles of SC-MFCs and SC-MFC-AdCEs of the present disclosure with BOx cathodes under 5 s rest and 2 s pulses at 3 mA.

FIG. 7 F is a graph of the electrode potential of SC-MFCs and SC-MFC-AdCEs of the present disclosure with BOx cathodes under 5 s rest and 2 s pulses at 3 mA.

DETAILED DESCRIPTION

According to an embodiment the present disclosure provides a novel bioelectrical system (BES) wherein an anode and cathode act as electrodes for an internal supercapacitor. While the present disclosure is directed primarily towards microbial fuel cells (MFCs) it will be understood that the various embodiments may suitably be utilized in a variety of BESs.

Figure 1A:
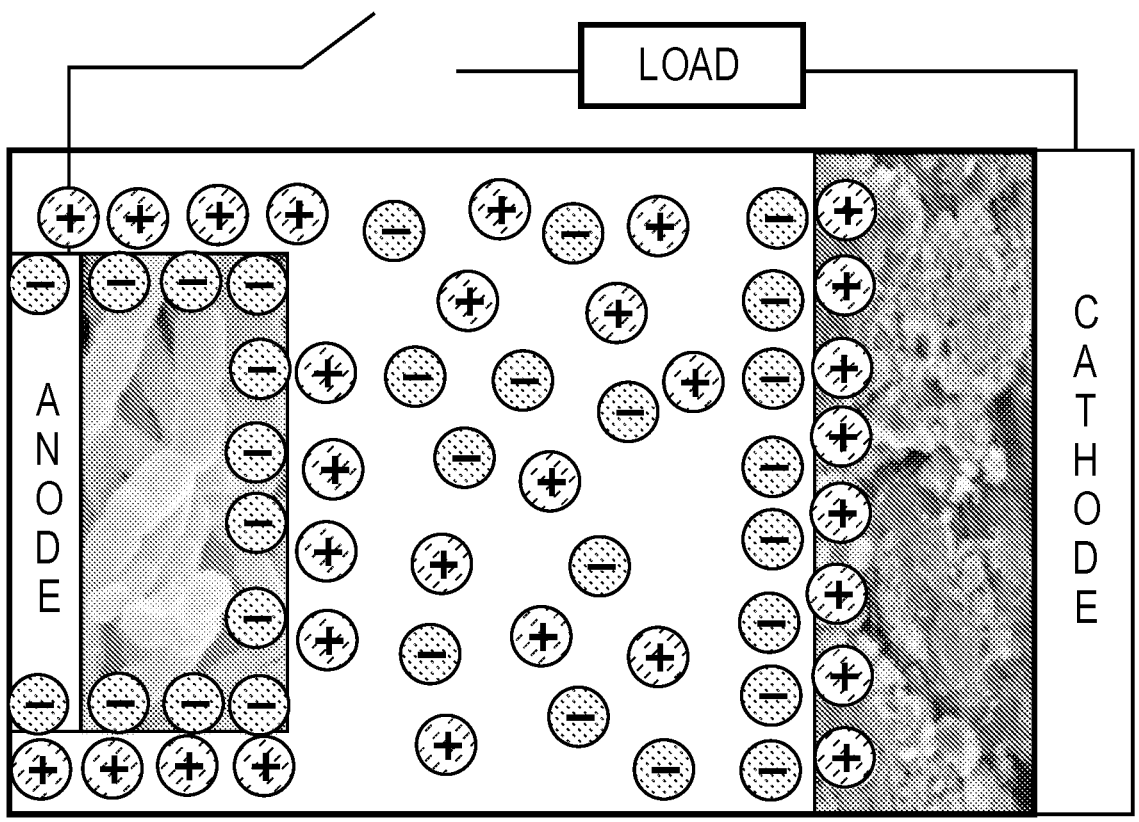
FIG. 1A is a schematic illustration of an MFC of the present disclosure wherein the anode and cathode of the MFC act as the negative and positive electrodes of an internal supercapacitor.
Figure 1B:
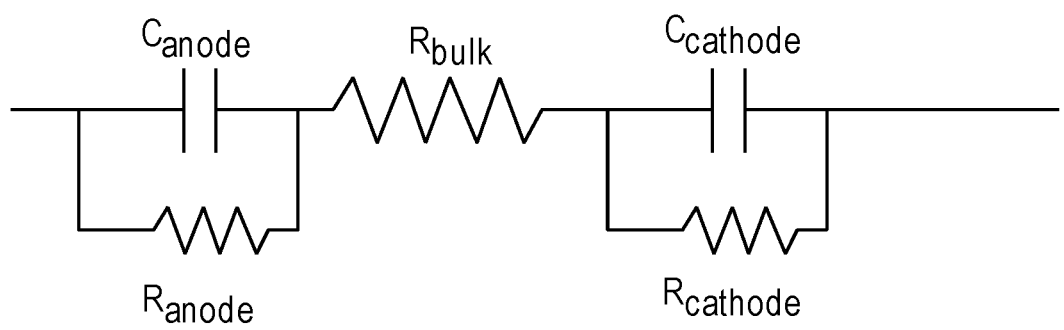
FIG. 1B is a diagram of the equivalent circuit of the MFC of FIG. 1A.

Turning to FIGS. 1A and 1B, a schematic illustration of an MFC wherein the anode and cathode of the MFC is used as the negative and positive electrodes of an internal supercapacitor is shown. For the purposes of the present disclosure, an MFC including electrodes that are used as the electrodes of the internal supercapacitor is referred to herein as a "supercapacitive MFC" (SC-MFC). In general, the SC-MFC comprises an anode colonized with cultures of electroactive bacteria and a cathode comprising an ORR catalyst (or, as explained in greater detail below, a catalyst for another desirable reaction). In the depicted embodiment, the SC-MFC has a membraneless configuration which allows exposure of the anode and cathode to the same electrolyte, although it will be understood that configurations with membranes are also contemplated. In general, electroactive bacteria on the anode oxidize organics present in the "fuel" (which may be, for example, wastewater) producing electrons, protons, carbon dioxide and intermediates of organics. Protons, carbon dioxide and the organic intermediates are released into the anodic solution while electrons flow through the external circuit generating positive electrical current. At the cathode, the electrons react with oxygen, generating $H_2O$ or $OH^−$, depending on whether the operating conditions are acidic ($H_2O$) or alkaline ($OH^-$). In the oxygen reduction reaction (ORR), the reaction can follow either a $2e^-$ or $4e^-$ pathway. Under rest conditions, the cell voltage ($V_{max, OC}$) of an MFC is determined by the electrode equilibrium potentials. The anaerobic anode equilibrium potential of acetate oxidation at pH 7 is equal to ~−500 mV vs Ag/AgCl. The theoretical potential for the ORR at pH 7 is ~620 mV vs Ag/AgCl (Erable et al., 2012). The anaerobic (bio-anode) and aerobic (cathode) environments of the MFC polarize the carbon electrodes towards values that are more negative and positive than the typical equilibrium potential (near 0 mV vs Ag/AgCl (Béguin et al., 2014)) exhibited by metal and catalyst-free carbons in the deaerated electrolytes (e.g. supercapacitors electrolytes). The electrode processes result in the formation of electrochemical double layers at the SC-MFC electrode/electrolyte interfaces. The excess of negative and positive charges at the polarized anode and cathode surfaces respectively is balanced by positive and negative counter ions coming from the ionic species dissolved in the solution. Electrolyte ions migrate to the oppositely charged electrodes, forming an electrochemical double layer at each of the high surface area carbonaceous electrodes of the SC-MFC. The SC-MFC electrostatically stores charge at $V_{max,OC}$, just like a charged EDLC.

The SC-MFC anode and cathode can be discharged by a rapid supercapacitive electrostatic process. The electrostatic surface charges are neutralized by the electron flow through the external circuit (from the anode to the cathode) while ions are released and recombined into the bulk wastewater solution. The energy that was electrostatically stored can thus be delivered by high and short galvanostatic discharge pulses (GLV) and high power output is achieved. Subsequent rest, i.e. setting the MFC in open circuit voltage (OCV) without any external load applied, restores the electrode equilibrium potentials. The carbon electrodes are polarized again, the double layers at each electrode are re-established, and the internal EDLC is recharged. Under these conditions, the system operates as a self-powered supercapacitor.

According to various embodiments, the electrodes of the presently described SC-MFC can be specifically designed to have a very high surface area, enabling the storage of a very high concentration of ions and, therefore, of charges, thus resulting in a high capacity MFC. The high surface area of the anode has the additional benefit of enabling and encouraging colonization by bacterial cultures and may be formed of a carbonaceous or non-carbonaceous conductive material. For the purposes of the present disclosure, the term "high surface area" is intended to mean material with surface area between 50 $m^2$ $g^{-1}$ and 2000 $m^2$ $g^{-1}$. According to a specific embodiment, the anode may be formed from commercially available carbon brush (Millrose, USA), carbon powder or activated carbon powder deposited or pressed on carbon fibers (e.g. carbon paper, cloth, brush, felt, etc.), or other metals (e.g. stainless steel, copper, etc). A bacterial colony comprised of one or more species of electroactive bacteria (or a combination of electroactive and non-electroactive bacteria) can then be grown or placed on the anode. Suitable electroactive bacteria include, but are not limited to Geobacter Metallireducens (See, e.g., Lovley et al., Geobacter: the microbe electric's physiology, ecology, and practical applications. Adv Microb Physiol. 2011; 59:1-100), *Shewanella* (See, e.g., Gorby et al., Electrically conductive bacterial nanowires produced by *Shewanella oneidensis* strain MR-1 and other microorganisms. PNAS USA. 103 (30), 11358-11363), or a mixed culture electroactive biofilm (See e.g., Santoro et al., Influence of Anode Surface Chemistry on Microbial Fuel Cell Operation. Bioelectrochem. 2015, 106, 141-149).

As stated above, an MFC cathode is or contains a catalyst for the desired reaction (e.g., ORR) and is typically formed from a material or combination of materials which may include or be selected from one or more carbonaceous or non-carbonaceous materials (which may or may not be catalytic), platinum and/or platinum-free catalytic materials, enzymes, and microbes. MFCs require biological components and thus typically require a neutral pH (i.e. ~7). Accordingly, it may be desirable for the cathode to be formed from material which is known to perform well at neutral pH. Examples of suitable cathode materials for the presently disclosed MFCs include materials incorporating high surface area activated carbon (AC), carbon black, graphitized carbon, amorphous carbon, carbon doped with heteroatoms (S, P, B, Al, N, O) and/or 3D materials such as those described in U.S. patent application Ser. No. 14/900,697, which is hereby incorporated by reference. For the purposes of the present disclosure, the term "high surface area" is intended to mean surface areas between 50-2000 $m^2$ $g^{-1}$.

According to various embodiments, the cathode catalysts may a platinum group metal (PGM)-free catalyst such as those which are typically categorized as metal-X-carbon (M-X—C) catalysts. Typically the metal is a transition metal such as, though not necessarily limited to Fe, Ni, Co, Mn, Cr, Zn, Cu, Ag, V, Mo, W while the X may be, for example, selected from the group consisting of S, P, B, Al, O, and N.

According to some embodiments, the cathode catalyst may be a PGM-free catalyst such as those described in U.S. patent application Ser. No. 14/126,788. The method for making the catalysts described in the '788 application produces a self-supported high surface area catalyst with a highly complex morphology that is especially suited for the BESs of the present disclosure. Briefly, the '799 application discloses a method whereby precursors of a platinum group metal-free and carbon are mixed with dispersed sacrificial particles under suitable conditions to allow the precursors to surround (and in some cases intercalate) the sacrificial particles. The mixture is then heat treated or subjected to mechanochemical synthesis in such a way that a carbon-metal material forms around (and possibly within) the sacrificial particles. The particles are then removed, for example by chemical etching, and a self-supported high surface area catalyst remains. In the '799 application, the carbon precursors are non-porphyrin precursors such as 4-aminoantipyrine, phenylenediamine, hydroxysuccinimide, and ethanolamine. Other suitable self-supported high surface area cathode catalysts are described, for example in U.S. patent application Ser. Nos. 14/414,132, 14/435,762, 14/091,776, 11/872,836, 14/761,390, and 14/126,565, each of which is hereby incorporated by reference. These patent applications described methods for making a variety of non-PGM-based metal-nitrogen-carbon (M-N—C) catalysts including, but not limited to iron-aminoantipyrine (Fe-AAPyr), iron-carbendazim, (Fe-CBDZ), iron-nicarbazin (Fe—NCB), iron-polymeric precursors (Fe-PEI) as well as equivalent catalysts comprising other transition metals.

Examples of suitable enzymes which may be incorporated into the cathode include, but are not limited to oxidoreductase enzymes such as bilirubin oxidase enzymes (BOx), laccase or ascorbate oxidase. Suitable microbes include *Acidithiobacillus ferrooxidans, Desulfosporosinus orientis, Thiobacillus denitrificans* and *Sulfurimonas denitrificans* and *Desulfovibrio piger.* (See, e.g., T. de Campos Rodrigues & M. A. Rosenbaum. Microbial Electroreduction: Screening for New Cathodic Biocatalysts. ChemElectroChem 2014, 1, 1916-1922)

Figure 2A:
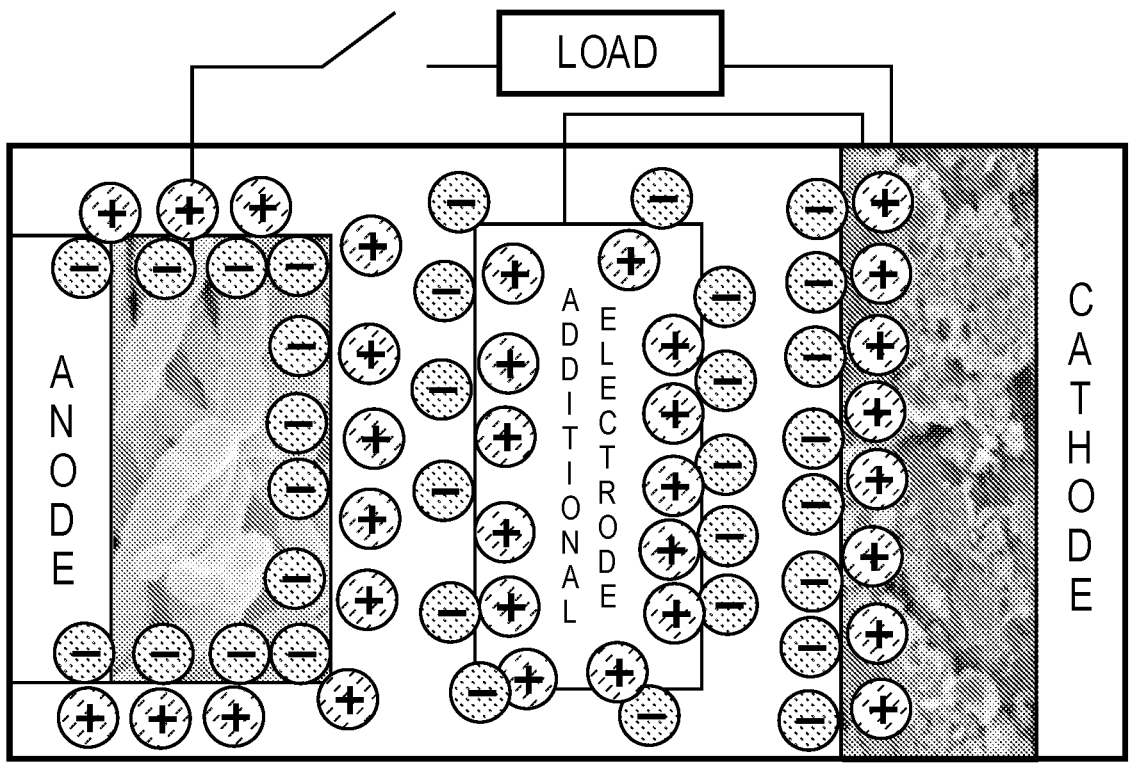
FIG. 2A is a schematic illustration of an MFC of the present disclosure with a third, additional, electrode (AdE) wherein the anode and the cathode-short-circuited AdE are used as the negative and positive electrodes of an internal supercapacitor.
Figure 2B:
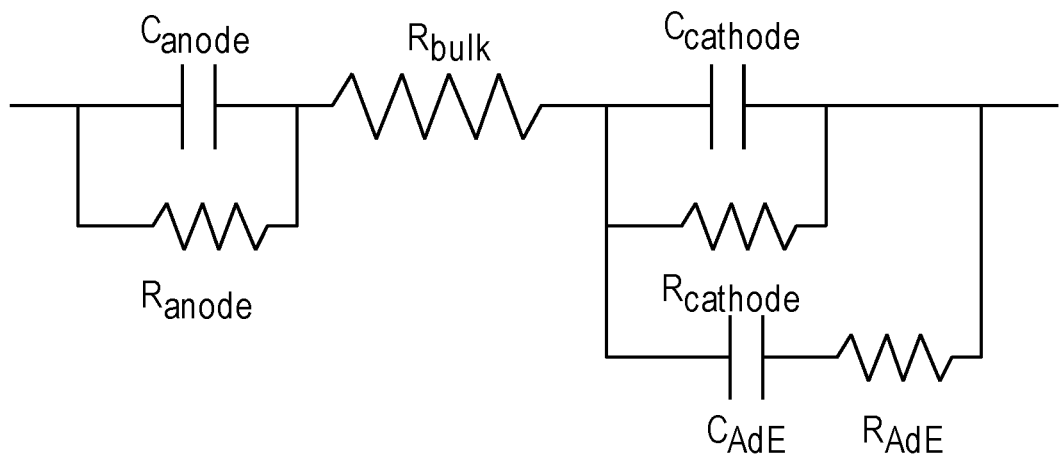
FIG. 2B is a diagram of the equivalent circuit of the MFC of FIG. 2A.

Turning to FIGS. 2A and 2B, the SC-MFC comprising an internal supercapacitor may be further modified by the presence of a third electrode (referred to herein as an "additional electrode" ("AdE") which is short-circuited with the cathode and coupled to the SC-MFC anode, as shown in the circuit diagram of FIG. 2B. The AdE circumvents the ohmic losses of the "weak" electrode, which in the depicted configuration is the cathode. The AdE may, for example, be formed from high surface area carbonaceous or non-carbonaceous conductive material including for example, high capacitance materials such as $MnO_2$, $RuO_2$ and other pseudacapacitive materials like electronically conducting polymers (e.g. PEDOT-PSS, etc). Because it is short-circuited to the cathode, the AdE can easily be brought to the same potential value as the cathode, leading to the formation of an electric double-layer at the interface between the AdE surface and the surrounding electrolyte. Coupling the AdE with the SC-MFC anode provides an internal, self-powered EDLC that can be rapidly discharged by an electrostatic process to give high-power output. According to Kirchhoff's law, the highest current will flow though the lowest resistance branches of the circuit, i.e. the SC-MFC anode and AdE electrode resistances and the electrolyte resistance. The SC-MFC cathode is then excluded with a positive effect on equivalent series resistance (ESR) and power output.

As described in greater detail in the examples section below, an SC-MFC with an internal supercapacitor and a third, additional electrode (SC-MFC-AdE), was able to self-charge in the order of seconds to minutes (as opposed to the previously described MFCs with external supercapacitors where commercial EDLC recharge was on the order of minutes to hours) while providing high power current equivalent to that of MFCs with external supercapacitors.

As discussed in the example section below, the SC-MFCs shown in FIGS. 1-2 are suitable for use in applications where wastewater (civil or industrial) is used as the electrolyte, and thus a similar system may be useful for water reclamation projects, at the very least in that water that is otherwise deemed to be sludge, waste, non-potable, or unusable, can be used to produce energy.

Figure 3:
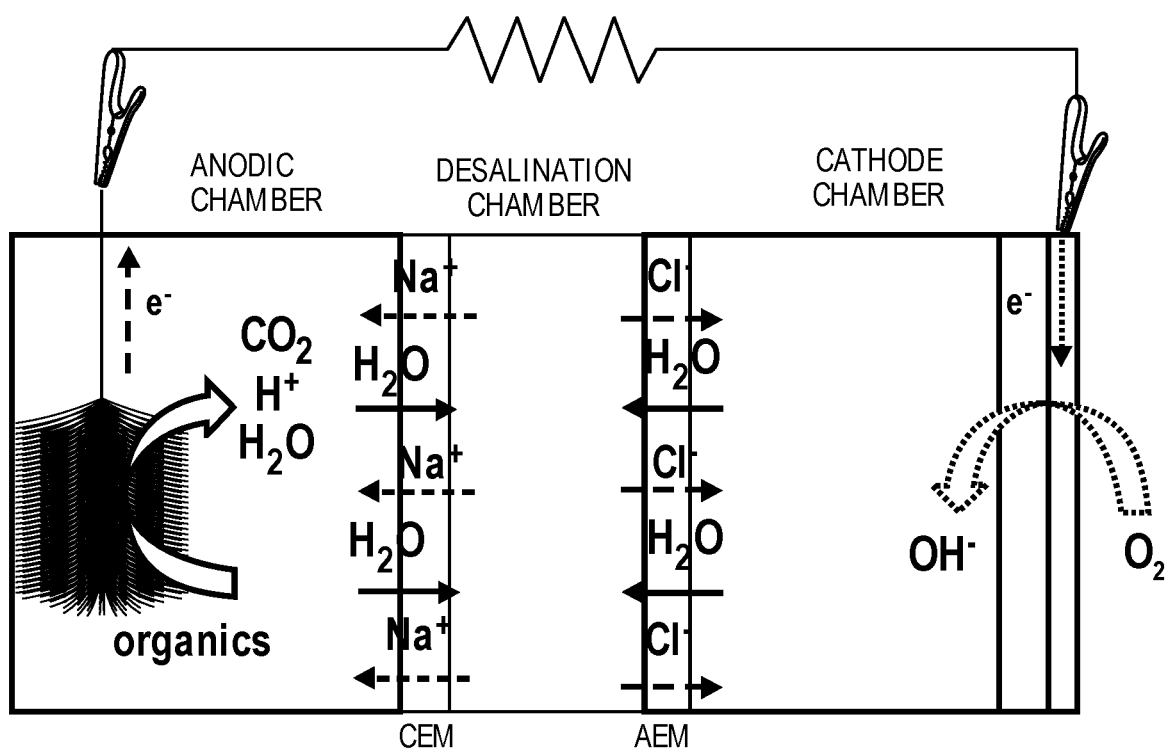
FIG. 3 is a schematic illustration of a microbial desalination cell (MDC) of the present disclosure.
Figure 4A:
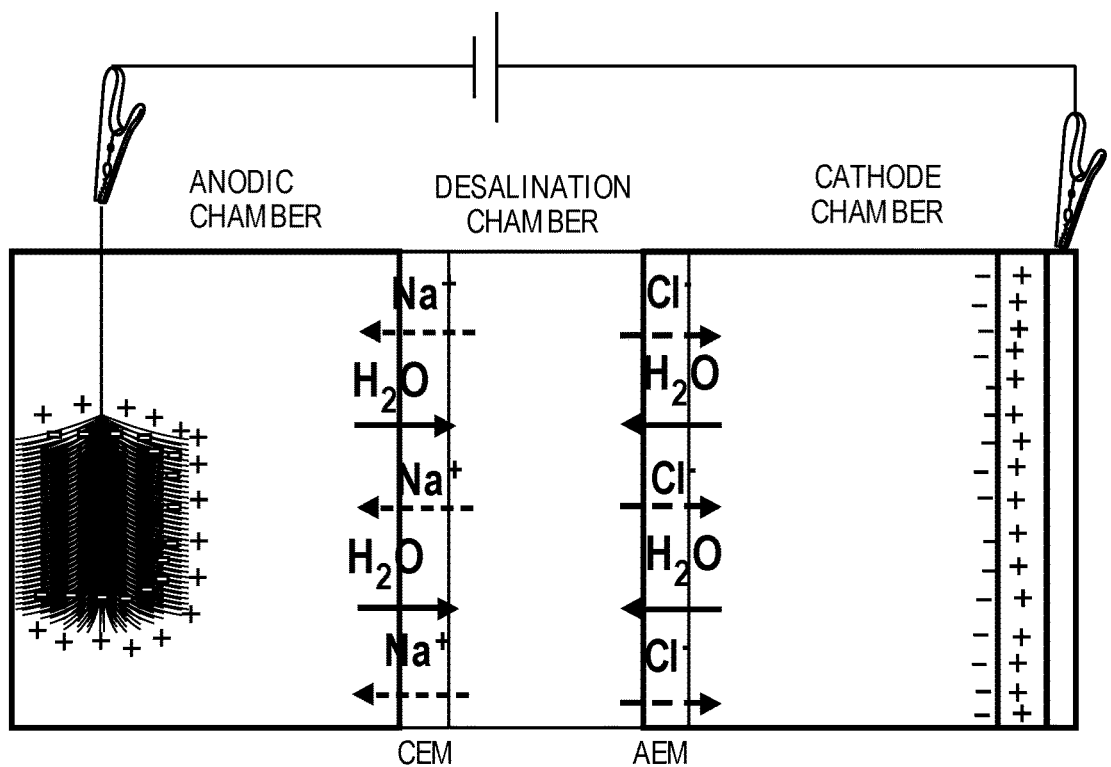
FIG. 4A is a schematic illustration of a supercapacitive microbial desalination cell (SC-MDC) of the present disclosure.
Figure 4B:
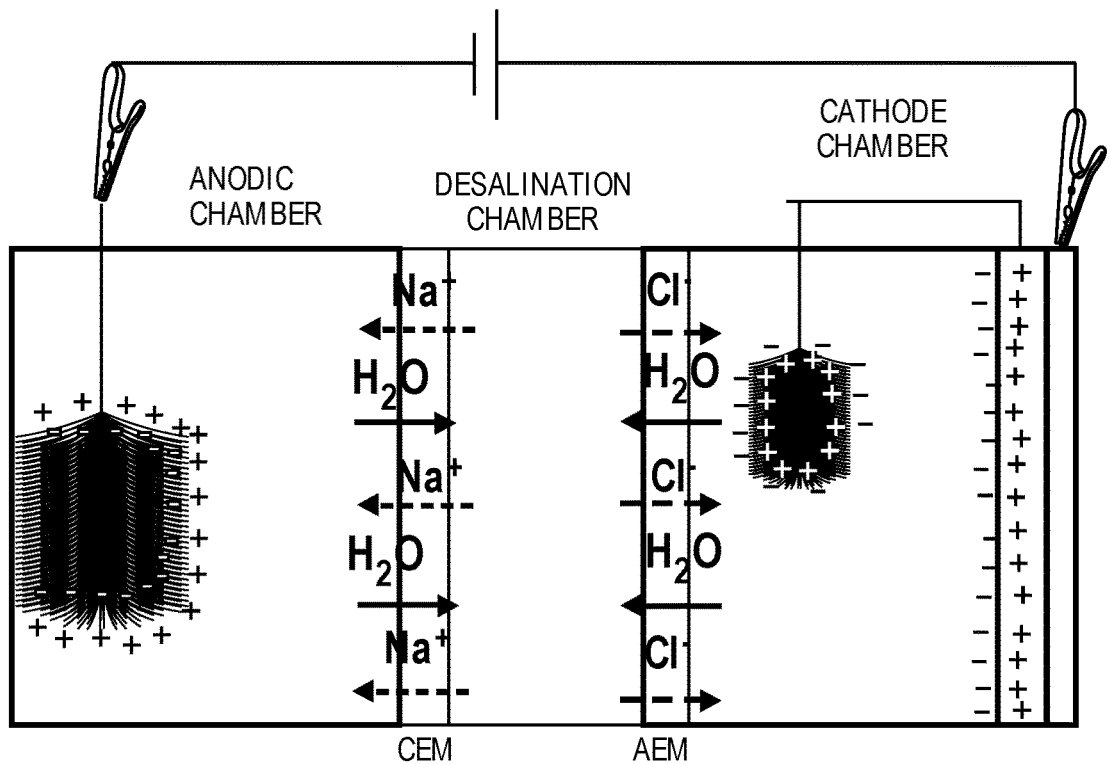
FIG. 4B is a schematic illustration of a supercapacitive microbial desalination cell with an additional electrode (SC-MDC-AdE) of the present disclosure.

As stated above, MFCs have also been explored as useful systems for water desalination. FIG. 3 shows a traditional microbial desalination cell (MDC). FIG. 4A shows a supercapacitive microbial desalination cell (SC-MDC). FIG. 4B shows a supercapacitive MDC with an additional electrode (SC-MDC-AdE). In each of the systems shown in FIGS. 3, 4A and 4B, the central chamber (desalination chamber, DC) is dedicated to salty water. In general, the anode chamber can be separated from the DC by a membrane which may be, for example, a cation exchange membrane. The cathode chamber may be separated from the DC by an anion exchange membrane. Those of skill in the art will be familiar with commercially available cation and anion exchange membranes such as those sold by DuPont (E. I. du Pont de Nemours and Company) and FuMA-Tech (FuMA-Tech GmbH, Germany).

The SC-MDC works in very similar fashion to the SC-MFC described above. However, it should be noted that in the depicted embodiment, the position of the membranes is reversed compared to traditional MFCs in order to enhance the electrostatic attraction of counter ions from the desalination chamber to the anode and cathode chambers and to increase the desalination rate. In this particular case, one of the collected by-products of the fuel cell's energy production is pure water. In general, electroactive bacteria on the anode oxidize organics present in the "fuel" (which may be, for example, wastewater) producing electrons, protons, carbon dioxide and intermediates of the organics. Protons, carbon dioxide, and the organic intermediates are released into the anodic solution while electrons flow through the external circuit generating positive electrical current. At the cathode, the electrons react with oxygen, generating $H_2O$ or $OH^-$, depending on whether the operating conditions are acidic ($H_2O$) or alkaline ($OH^-$). In the oxygen reduction reaction (ORR), the reaction can follow either a $2e^-$ or $4e^-$ pathway. All of which is identical to the membraneless MFC embodiment described above. However, as stated above, in this embodiment, a desalination cell is separated from the anode and cathode chambers via cation and anion exchange membranes, respectively. The position of these membranes is selected to maximize ion diffusion and migration to the anodic and cathodic chambers, as indicated above. In this embodiment, the cations and anions move through the selective cationic and anionic membranes, respectively. For example $Na^+$ moves through the cation exchange membrane, which allows transport of positive ions while $Cl^-$ moves through the anion exchange membrane, which allows the transport of negative ions. The transport of ions through the selective membranes takes place by both diffusion and migration. Diffusion is governed by Fick's law, in which the driving force is the gradient of concentration between the desalination cell and the anode and cathode chamber. Consequently, ions move from the desalination chamber (more concentrated) to the anode and cathode chambers (less concentrated) via diffusion through the selective membranes. Forward osmosis also takes place with transport of $H_2O$ from the anode and cathode chambers to the desalination chamber. A redox reaction at both the anode and cathode allows the generation of a potential difference between the two electrodes. At the anode, the bacteria that colonize the electrode consume oxygen creating an anaerobic zone in which the potential is strongly pushed towards negative values. In contrast, the air-breathing configuration used at the cathode allows oxygen to be present, keeping the potential at a high value. This results in the anode and cathode being negatively and positively polarized. The resulting potential difference at the electrodes causes migration of ions from the desalination cell to the anode and cathode chamber. The surface charge of the electrodes is balanced by counter ions of dissolved ionic species in the electrolyte solution surrounding the electrode, i.e. the negatively charged anode will attract positive ions and the positive charged cathode will attract negative ions, thereby forming an electrochemical double layer at each electrode. The ions required to counterbalance the surface charges move through the selective membranes to oppositely charged electrodes forming an electrochemical double layer at each of the high surface area carbonaceous electrodes which both produces the supercapacitive effect and contributes to the desalination process. In some of the presently described embodiments, the electrodes are specifically designed, for example by being formed from high surface area material so as to allow the electrodes to store a very high quantity of ions from the surrounding electrolyte, thereby enabling the system to store the charges like an EDLC. As with the embodiment described above, the stored ions can then be discharged by a fast and reversible electrostatic process in which the ions are released in the electrolyte solutions of the anodic and cathodic chamber. The electrostatically stored energy can thus be delivered by short galvanostatic discharge pulses generating high power output. After the discharge, during rest, the electrodes restore their potential equilibrium, and are then repolarized, and the electrochemical double layer is produced again. Therefore, ions are removed again from the desalination cell and harvested in the anodic and cathodic chambers. Repetition of discharge-rest steps can be seen as repeated, intermittent generation of power pulses followed by pumping of ions out of the desalination cell.

As shown in FIG. 4B, an additional electrode (AdE) can be provided in the cathode chamber in order to increase performance. As described above with respect to other embodiments, the additional electrode may also have a high surface area and may be coated or formed from a material that will increase the capacitive response of the cathode. As described in greater detail in the Examples section below, the inclusion of an additional electrode in the cathode chamber results in higher overall performance due to a decrease in ohmic resistance and an overall increase in capacitance.

According to another embodiment, multiple SC-BESs, including the above-described MFCs and MDCs can be arranged in series to increase overall production of power, desalinated water, etc. Moreover, some or all of the MFCs in the series may include an additional electrode.

Figure 5:
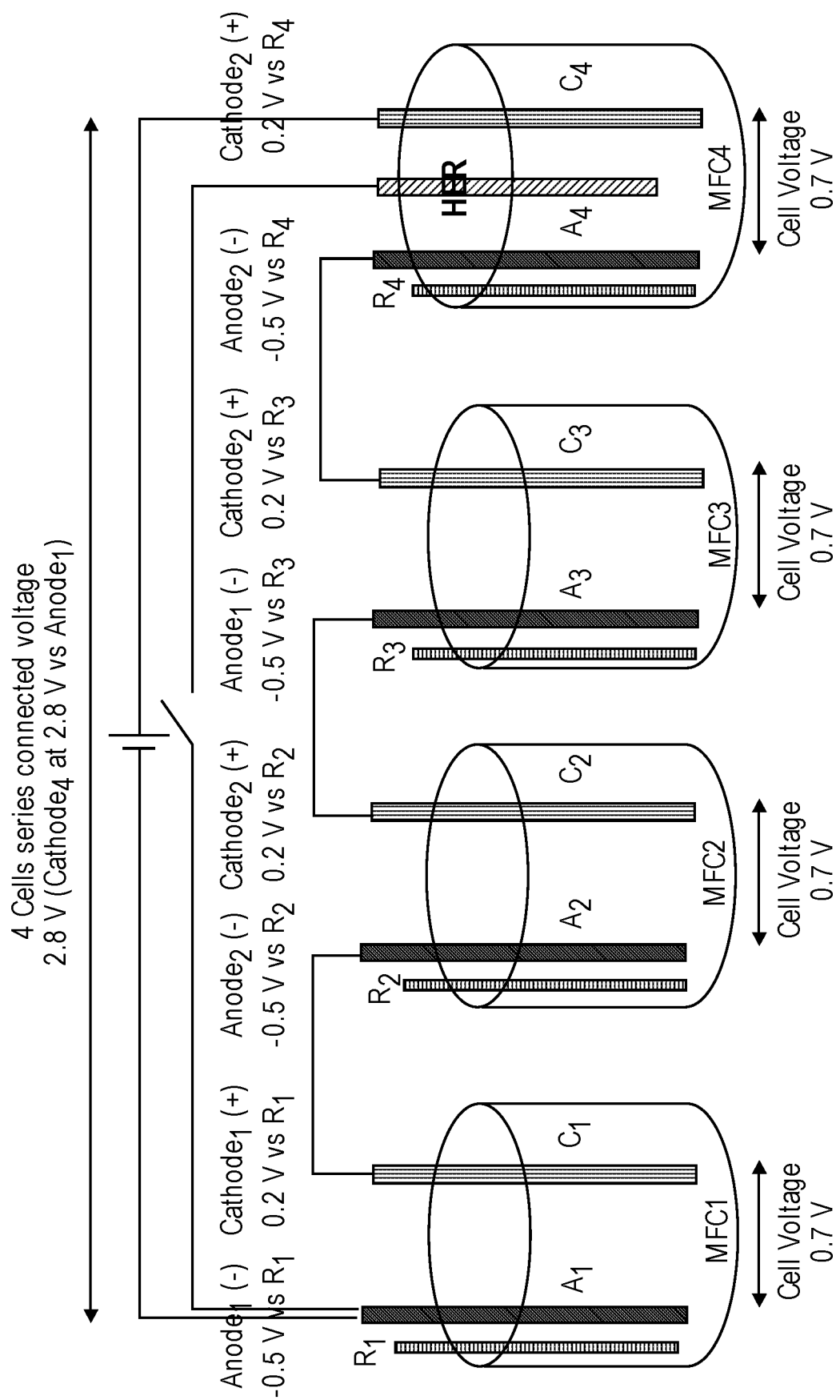
FIG. 5 is a schematic illustration of a plurality of MFCs of the present disclosure in series.

Turning now to FIG. 5, yet another embodiment of the present disclosure is provided. In this embodiment, four SC-MFC cells are connected in series with the final cell having an additional electrode optimized for the hydrogen evolution reaction (HER). In this embodiment, the SC-MFC cells provide the voltage to drive the HER electrode potential in the fourth cell to the appropriate value for hydrogen evolution. As described in greater detail in the Examples section below, the system shown in FIG. 6 was able to simultaneously generate power from galvanostatic discharges and produce hydrogen through HER.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

EXAMPLES

I. Self-Powered Supercapacitive Microbial Fuel Cell
MFC Configuration and Electrolyte Composition
A single glass bottle (Cataldo Arbore, Milan, Italy) with 125 mL volume was used. A cathode was inserted through a lateral hole of 2.25 cm$^2$ and screwed to the glass using a metallic clamp. A membraneless configuration was used to allow exposure of the anode and cathode to the same electrolyte. A reference electrode (Ag/AgCl 3M KCl) was included for basic electrochemical studies. The electrolyte was composed of a mixture of 50% volume activated sludge from Albuquerque Southeast Water Reclamation Facility (New Mexico, USA) and 50% volume phosphate buffer saline solution (PBS) and KCl 0.1 M. PBS was made using $KH_2PO_4$ (1.77 g) and $K_2HPO_4$ (15.16 g). The pH of the electrolyte was 7.5+/−0.02. An air breathing cathode configuration was used and the tests were run in ambient conditions. The experiments have been carried out in Albuquerque at a constant temperature that was 22+/−1° C. and at 1600 m above sea level. At that altitude, oxygen concentration is roughly 20% lower compared to sea level due to the lower air pressure. This parameter was to be taken into account for comparison of the performance of the air-breathing MFCs.

MFC Electrode Materials and Additional Cathode Material

Anode electrodes were based on a carbon brush (Millirose, USA) with 3 cm diameter 3 cm length, and 9 cm$^2$ projected area. The anodes were pre-colonized by mixed cultures of bacteria taken from previous experiments that had been running for over 4 months. A description of the cultures can be found, for example, in Santoro, et al., ChemSusChem 8 (5), 828-834 (2015). Cathodes comprising activated carbon (AC), iron-aminoantipyrine (Fe-AAPyr) and bilirubin oxidase (BOx) enzymes were each tested. All the cathodes tested had the same current collector formed from metallic stainless steel mesh (McMaster, USA). The AC-based cathode was prepared by mixing 70 wt % high surface area AC (Norit SX Ultra, Sigma Aldrich), 10 wt % carbon black (CB, Alfa Aesar) and 20 wt % PTFE (60 wt % solution, Sigma Aldrich) for 5 min in a grinder. The carbon black was added to enhance the composite electrode conductivity. After mixing, the composite material was pressed at 2 mT into a pellet die for 5 min (See e.g., Santoro et al., Bioresour. Technol. 163, 54-63 (2014). The composite loading was 35+/−5 mg cm$^{-2}$, the geometric area was 2.25 cm$^2$ and this value was used for the power normalization. The cathode was not heated. The volume used for power normalization refers to the chamber volume of 125 mL. A sacrificial support based method as described in Serov et al., Adv. Energy Mater 4 (2014) and Serov, et al., Appl. Catal. B 150, 179-186. (2014) was used to prepare the Fe-AAPyr which was then added to the activated carbon mixture described above and then mixed vigorously before pressing at 2 mT. The Fe-AAPyr loading was 1.5+/−0.1 mg cm$^{-2}$. The Box cathode was formed with 70 wt % AC, 10 wt % CB and 20 wt % PTFE ground for 5 min and then pressed at 2 mT for 5 min. After that, isopropanol (40 μL cm$^{-2}$) was added on the top to create a hydrophilic/hydrophobic gradient. A multi-walled nanotube paper (MWNTP, Buckeye Compo-site) was then fused to the top using 0.25 mT pressure for 5 min. Finally, 10 mg of BOx (Amano Enzyme, USA) dissolved in 50 mM PBS solution was drop-casted onto the MWNTP surface. The cathodes were kept at 4° C. overnight for enzyme immobilization. Before utilization, the liquid was dried and the cathode was screwed on the lateral hole of the bottle. The additional electrode for the super capacitor was carbon brush (Millirose, USA) having a 2 cm diameter and projected area of 4 cm$^2$ that was coated with a 95 wt % AC-5 wt % Nafion layer (0.3 g total). The carbon brush was immersed into a solution based on Nafion (0.5% alcohol solution Dupont, 1.0 mL), AC (100 mg) and water-isopropanol solution (1 mL) and then was dried in ambient atmosphere overnight. The addition of AC allowed an increase in the surface area of the carbon brush and consequently in the capacitance of the overall additional brush.

The additional electrode was completely immersed into the electrolyte and short-circuited with the MFC cathode.

Electrochemical Measurements

Figure 6:
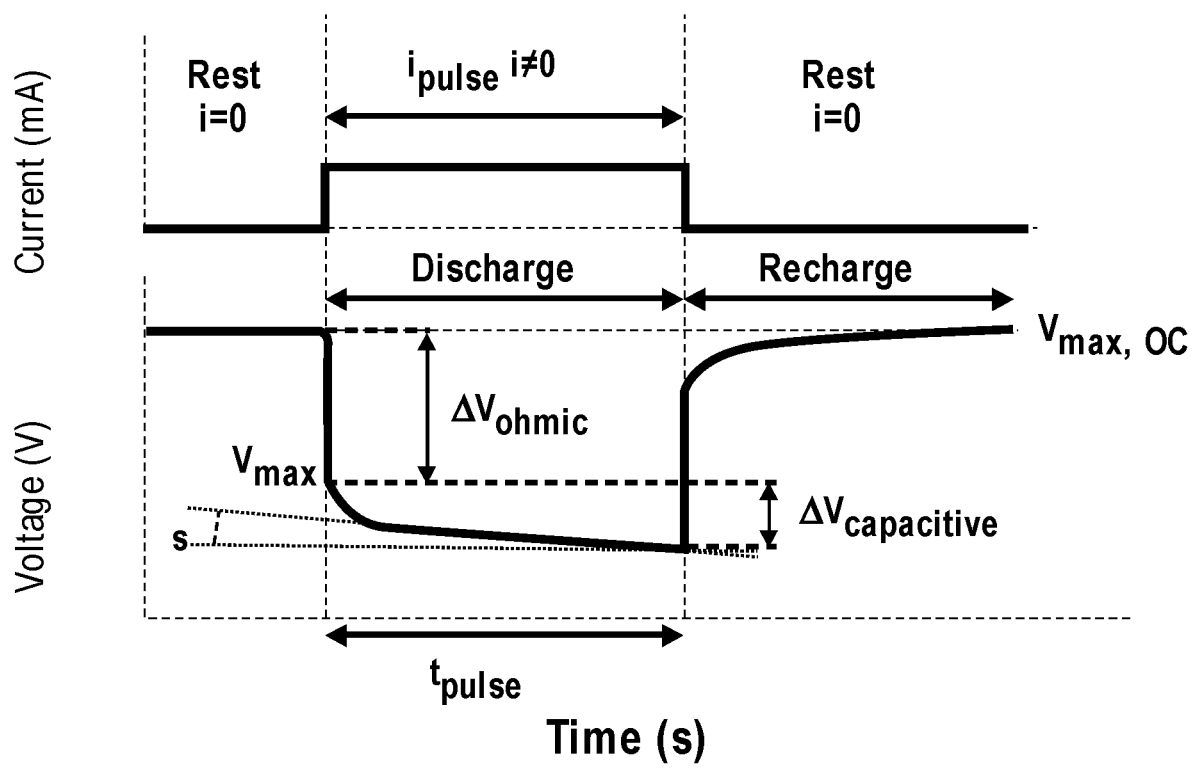
FIG. 6 is a diagram of the parameters used for the system performance evaluations of various SC-MFCs of the present disclosure.

Electrochemical measurements were performed with a potentiostat (SP-50, Bio-Logic, France). Electrochemical tests involved the repetition of the following sequence of steps: rest (OCV)-galvanostatic (GLV) discharge at different currents ($i_{pulse}$, A) from 1 mA up to 45 mA over 10 ms, 2 s, or complete discharge down to 0 V cell voltage. The use of the reference electrode permitted the simultaneous monitoring of the SC-MFC anode and cathode (eventually short circuited with the AdE) potentials as well as the cell voltage during the sequence repetition. FIG. 6 shows the parameters used for the system performance evaluations.

Results

Figure 7A:
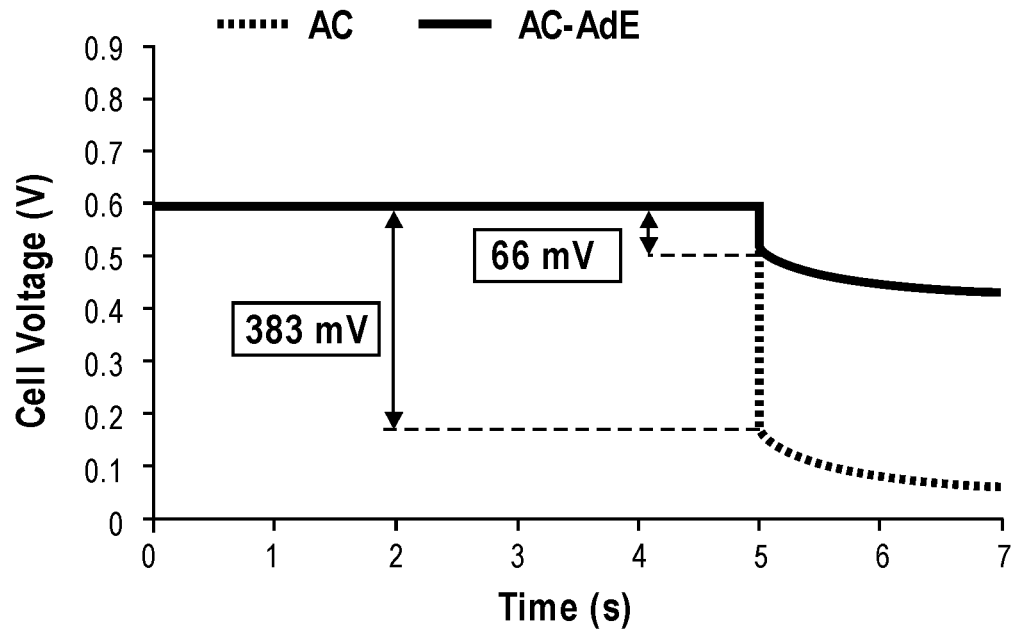
FIG. 7A is a graph of cell voltage profiles of SC-MFCs and SC-MFC-AdCEs of the present disclosure with activater carbon cathodes under 5 s rest and 2 s pulses at 3 mA.
Figure 7B:
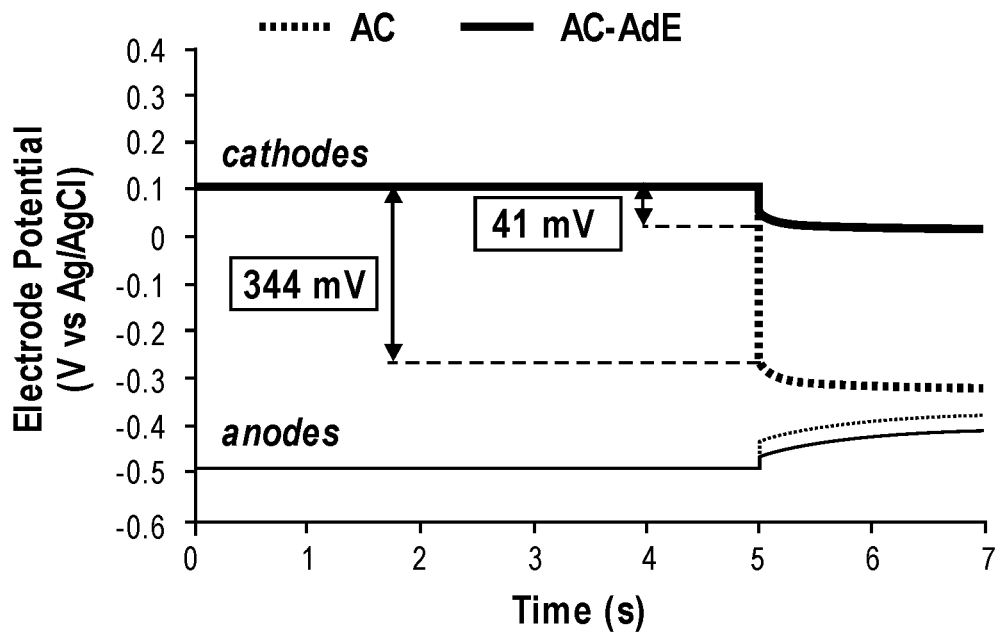
FIG. 7 B is a graph of the electrode potential of SC-MFCs and SC-MFC-AdCEs of the present disclosure with activated carbon cathodes under 5 s rest and 2 s pulses at 3 mA.
FIG. 7C is a graph of cell voltage profiles of SC-MFCs and SC-MFC-AdCEs of the present disclosure with Fe-AAPyr cathodes under 5 s rest and 2 s pulses at 3 mA.
Figure 7C:
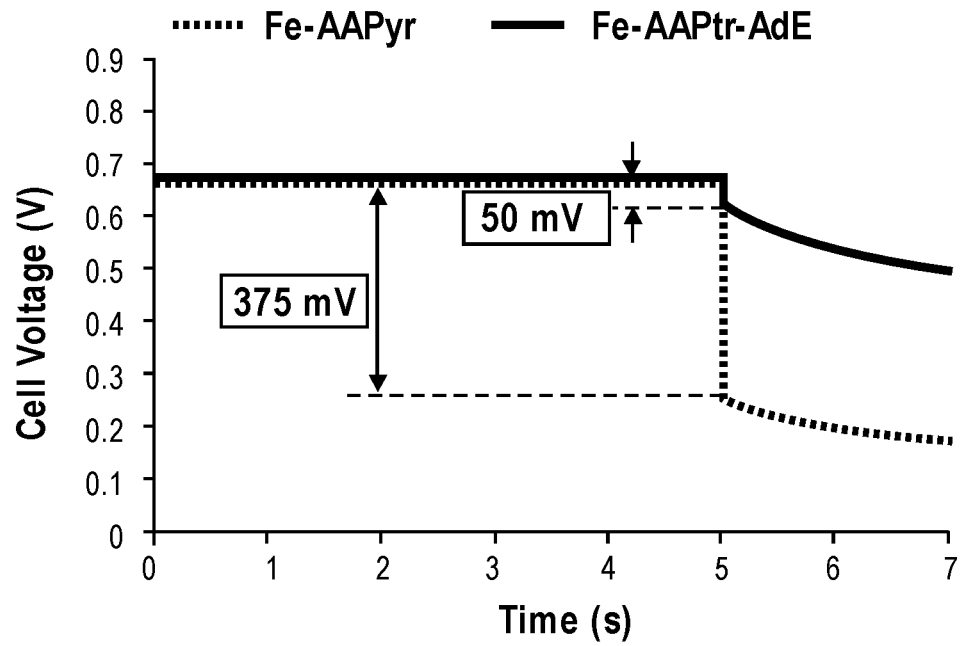
Figure 7D:
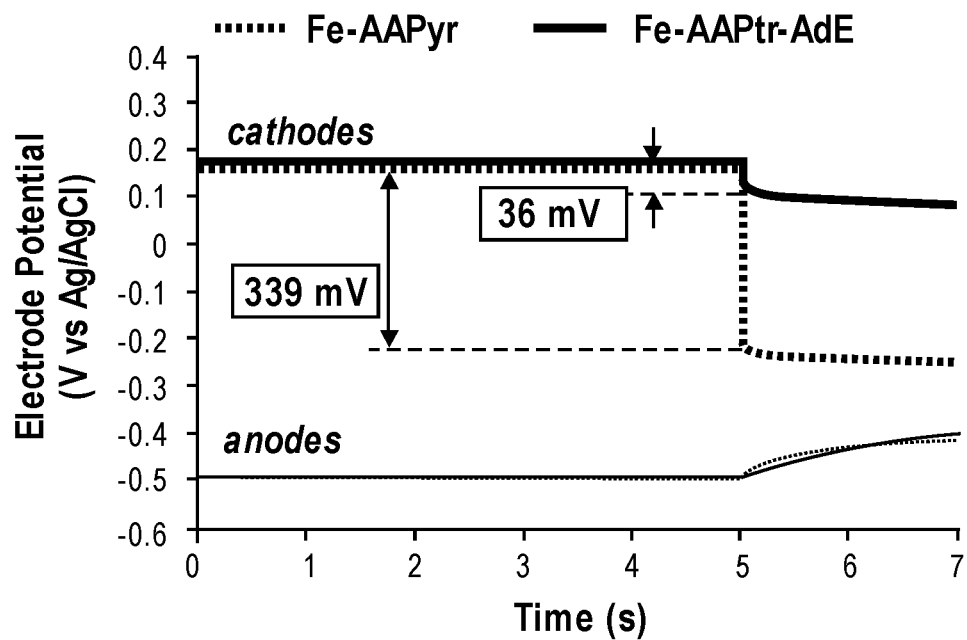
Figure 7E:
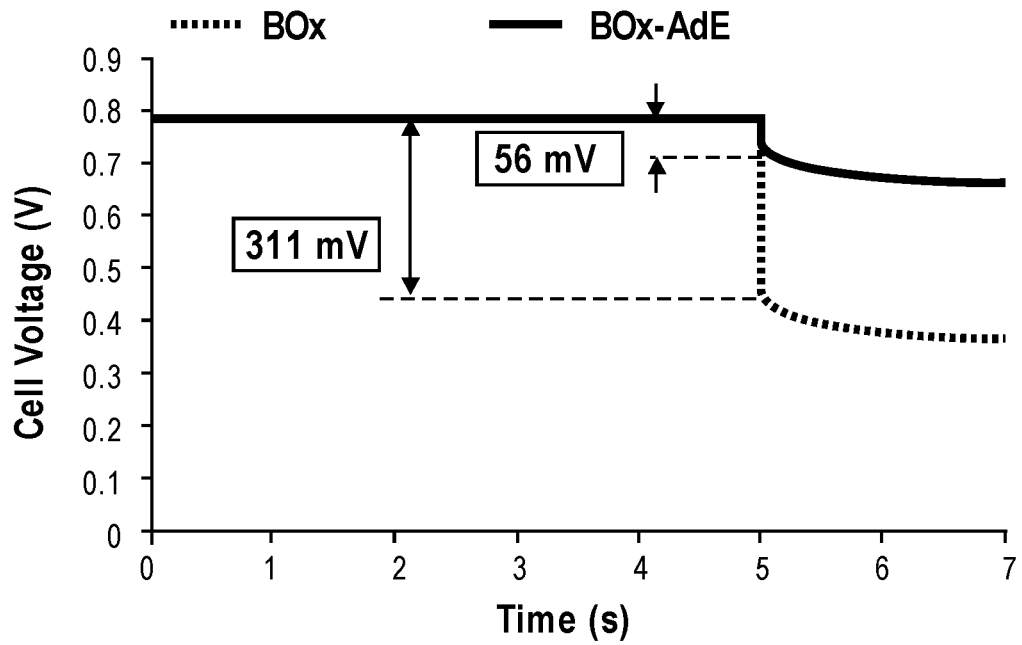
Figure 7F:
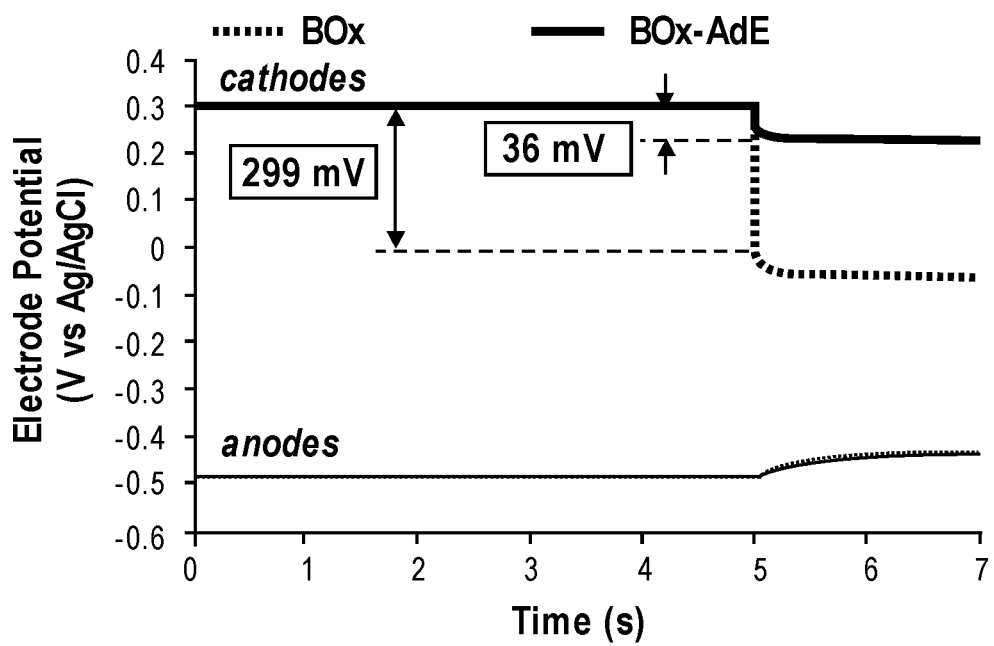

FIGS. 7A-7F show the SC-MFCs cell voltage and electrode potential profiles under the sequence test shown in FIG. 6 by 2 s ($t_{pulse}$) discharge pulse at 3 mA ($i_{pulse}$). The SC-MFCs investigated had three different cathodes described herein as AC, Fe-AAPyr and BOx. The AC, Fe-AAPyr and BOx SC-MFCs feature $V_{max}$, oc of 590 mV, 650 mV, and 790 mV, respectively. This trend follows the equilibrium cathode potentials of 105, 175 and 315 mV vs Ag/AgCl for AC, Fe-AAPyr and BOx cathodes. Higher cathode potentials of BOx compared to other catalysts have been previously shown (See e.g., Mano et al., J. Am. Chem. Soc. 125(50), 15290-15291, 2003). In all the investigated SC-MFCs the equilibrium anode potential was ≈−500 mV vs Ag/AgCl which is close to the theoretical value. The pulse caused the decrease of $V_m$ax, oc by ohmic ($\Delta V_{ohmic}$) and capacitive ($\Delta V_{capacitive}$) contributions (FIG. 7c). The $\Delta V_{ohmic}$ cell voltage losses were in the range of 311-383 mV (FIG. 7a, c, and e) which were due to ESRs of 105-130Ω. Monitoring the MFC electrode potentials during the pulse permitted the identification of the cathode as the main contributor of $\Delta V_{ohmic}$ and, hence, of ESR for all the MFCs (FIGS. 7b, d and f). Cathode overpotentials at $i_{pulse}$ equal to 3 mA were 299 mV for BOx, followed by Fe-AAPyr with 339 mV and AC with 344 mV and accounted for over 90% of the total MFC $\Delta V_{ohmic}$ and ESR. The high-electrode thickness (≈1 mm) that is required to avoid waste water leakage through the breathing cathode could be one of the parameters that determine the high cathode impedances (in the order of 100Ω, as evaluated by dividing the cathode overpotential by $i_{pulse}$). The lowest ohmic losses of the BOx cathode can be related to the use of CNT in the electrode preparation. CNT enhanced electronic conductivity compared to the AC-based electrodes. The anodes based on carbon brush colonized by electroactive bacteria featured very low overpotentials within a few mV (which accounted for less than 10% of the total SC-MFC $\Delta V_{ohmic}$ and ESR). This suggests that using high-surface area and high-conductivity carbon brush contributes to the very low anode impedance which varied in a small range of 4-13Ω. For all the SC-MFCs, the $\Delta V_{capacitive}$ cell voltage loss of the different MFCs was negligible and similar, indicating a comparable cell capacitance (C) response. The values of C estimated by the cell voltage slope(s) were between 80 and 100 mF. The electrode profile analyses indicated that anode and cathode almost equally contribute to C with electrode capacitances of ca. 200 mF.

Capacitance (C), equivalent series resistance (ESR), and maximum cell voltage under operation ($V_{max}$), which in turn depends on ESR, determines the practical maximum energy ($E_{max}$) and power ($P_{max}$) and the charge/discharge time constant (τ) of the supercapacitor.

Figure 8:
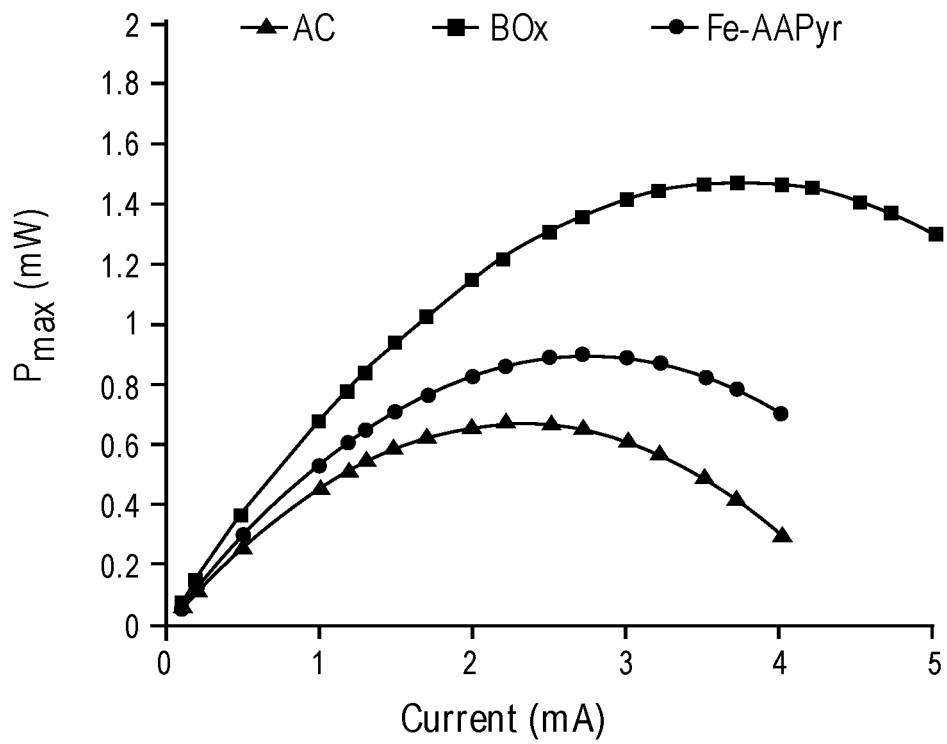
FIG. 8 is a graph of the $P_{max}$ vs $i_{pulse}$ plots of SC-MFCs of the present disclosure incorporating AC, BOx and Fe-AAPyr cathodes.

C and ESR were used to estimate the t which was on the order of 10 s, thus demonstrating the fast rate capability of the supercapacitive system. The $P_{max}$ for each of the SC-MFCs was calculated based on the measured $\Delta V_{ohmic}$ and the ESR. As shown in FIG. 8, $P_{max}$ values are 3-5 times higher compared to non-supercapacitive MFCs with similar configurations. (See, e.g., Santoro et al. J. Electrochem. Soc. 1 60(10), H720-H726 (2013), and Santoro et al., Sci. Rep. 5, 16596. (2015).

Returning to FIG. 7, the cell voltage and electrode potential profiles under 2 s discharge pulse at 3 mA for SC-MFC-AdE cells with AC, Fe-AAPyr, and Box cathodes are shown. FIGS. 7A, C, and E demonstrate that the use of the AdE with $i_{pulse}$ equal to 3 mA dramatically decreases $\Delta V_{ohmic}$ down to 66 mV, 50 mV and 56 mV with AC, Fe-AAPyr and Box cathodes, without modifying the corresponding $V_{max,OC}$. The SC-MFC-AdE ESRs evaluated by $\Delta V_{ohmic}$ are 6-8 times lower than MFCs' and reduced to 16-22Ω. FIGS. 7B, D, and F show that this result is due to the very low potential losses of the AdE short circuited cathodes, in turn related to their low impedances of ca. 13Ω. Given that the cell capacitance did not significantly change (except for the cell with Fe-AAPyr-AdE which exhibited 60 mF), the time response τ was substantially lowered to 2 s. The highest performance was achieved with the Box-AdE cell which at 3 mA featured a practical operation voltage of 734 mV and a $P_{pulse}$ of 2 mW ($t_{pulse}$=2 s). These are extremely high values that have never been reported before for microbial fuel cells.

Figure 9:
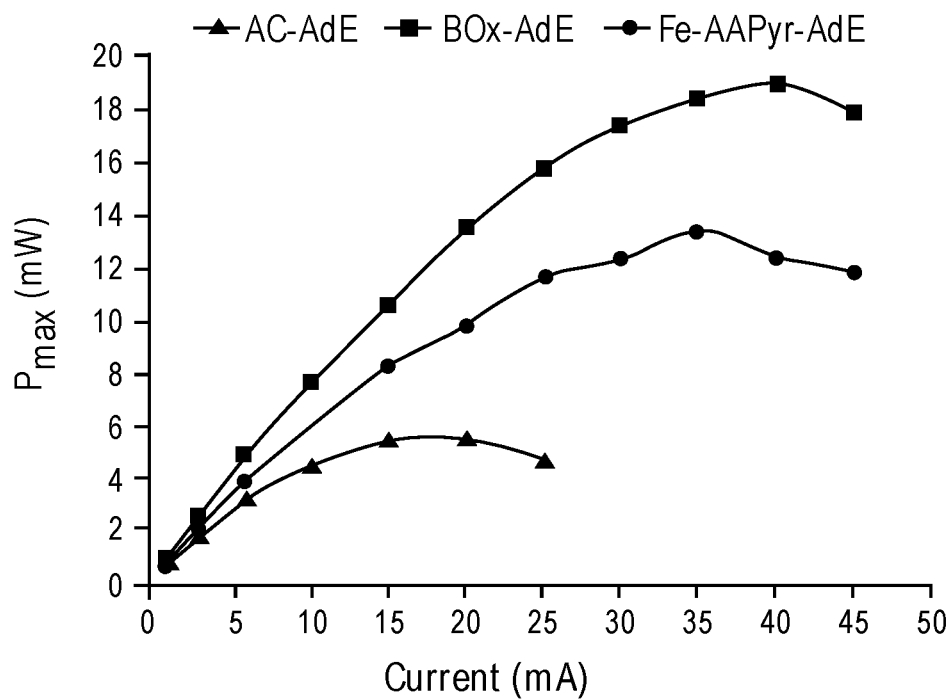
FIG. 9 is a graph of the $P_{max}$ vs $i_{pulse}$ plots for the three SC-MFC-AdEs of the present disclosure at different pulse currents.

FIG. 9 shows the $P_{max}$ vs $i_{pulse}$ plots for the three SC-MFC-AdEs at different pulse currents. As shown, the significant increase in ESR allowed the SC-MFC-AdEs to achieve pulse currents up to 45-50 mA-roughly 10 times higher than the 4-5 mA demonstrated with equivalent SC-MFCs without the AdEs.

Figure 10A:
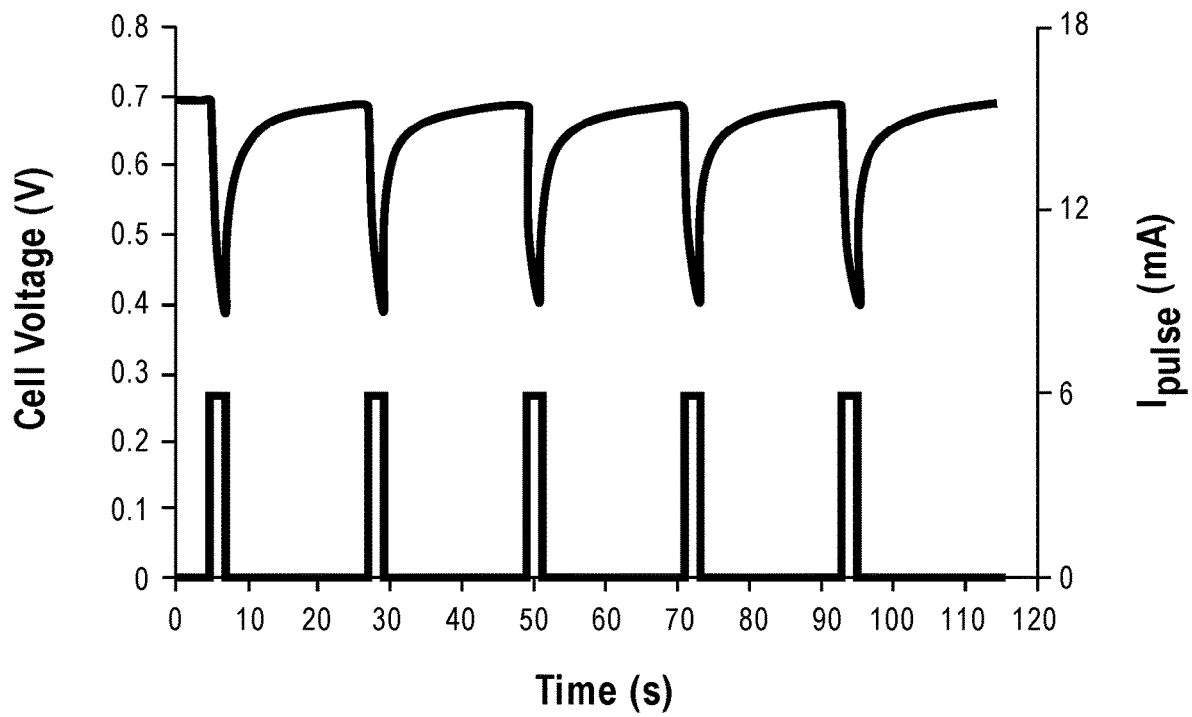
FIG. 10A is a graph of the voltage profiles of a Fe-AApyr-AdE of the present disclosure cell under on OCV-GLV-OCV sequence with 2 s-pulses at 6 mA and 20 s rest.
Figure 10B:
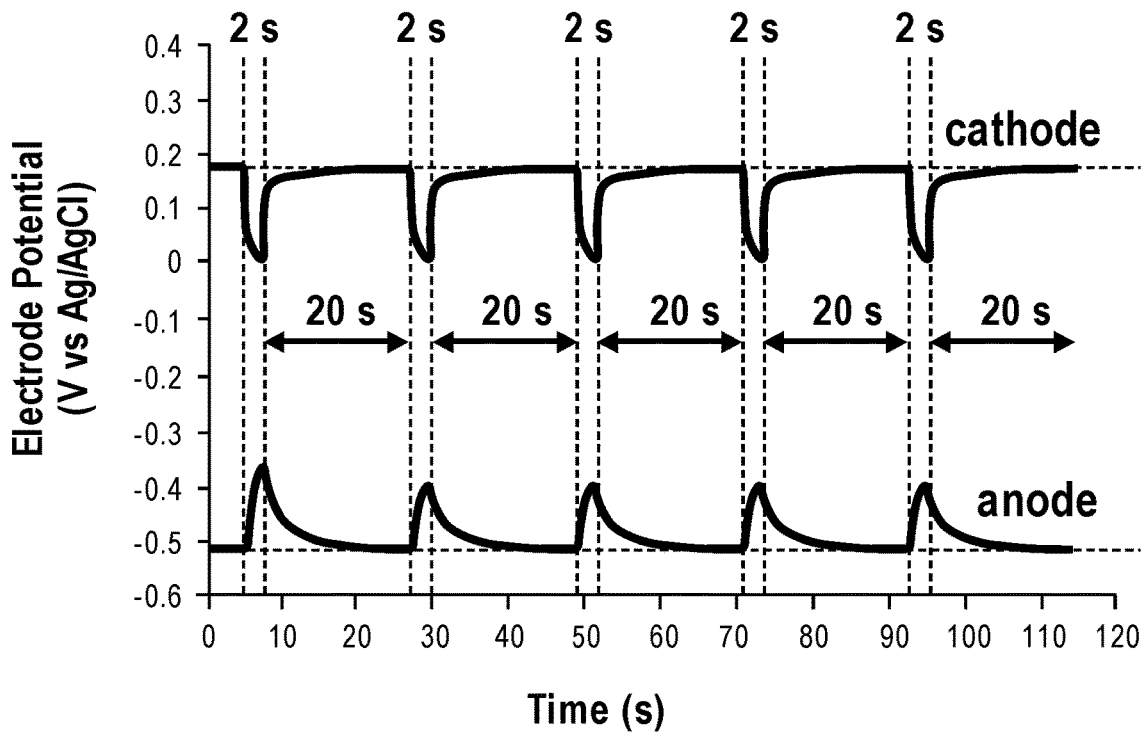
FIG. 10B is a graph of the electrode potential profile of a Fe-AApyr-AdE cell of the present disclosure under on OCV-GLV-OCV sequence with 2 s pulses at 6 mA and 20 s rest.

FIGS. 10A and B show the voltage (FIG. 10A) and electrode potential (FIG. 10B) profiles of the Fe-AAPyr-AdE cell under on OCV-GLV-OCV sequence with 2 s-pulses at 6 mA and 20 s rest. As shown, a 20 second rest was enough to restore the equilibrium electrode potentials and "recharge" the cell at the $V_{max,oc}$ voltage (FIG. 10B). Each cycle overlapped indicating the reversibility of the process. This underscores that the self-recharge of the internal EDLC is reversible and fast and can take place in the order of seconds. The cycling stability of the Fe-AAPyr-AdE was proven over 1000 OG-GLV steps which were performed by 10 ms-pulses at 10 mA followed by 10 s rest. The cell voltages as well as the anodic and cathodic potentials during the initial and final cycles had very similar trends thus indicating that high current regimes (10 mA) do not affect the performances of the cell. Equilibria anode and cathode potentials were recovered in a few seconds permitting stable, long-time operation.

II. Self-Powered Supercapacitive Microbial Desalination Cells (SC-MDC-AdE)

SC-MDC-AdE Materials and Methods

The cation and anion exchange membranes as well as the cathode each had an exposed geometric area of 7 cm². The anode was a cylindrical carbon brush (3 cm diameter and 3 cm height, Millirose) with a projected area of 9 cm² inserted into the anode chamber. The anode was pre-colonized and well working before the beginning of the experiments. The cathode was an air-breathing gas diffusional electrode. The pellet was composed of a mixture of activated carbon (AC, 70 wt % Norit SX Plus), carbon black (10 wt %, Alfa Caesar) and PTFE (20 wt %, 60 wt % solution Sigma Aldrich) that was grinded in a grinder for 5 minutes. This mixture was then further mixed with Fe-AAPyr for use as a cathode catalyst and then inserted in a pellet die and pressed at 2 mT for 5 minutes. The AC+CB+PTFE loading was 50 mg cm$^{-2}$ while Fe-AAPyr loading was 2 mg cm$^{-2}$. The additional electrode (AdE) was a carbon brush (2 cm diameter and 2 cm height, Millirose) coated with activated carbon (AC) in order to increase the capacitive response.

The middle chamber of the SC-MDC-AdE was dedicated to water desalination (desalination chamber, DC) and had an empty volume of 11 mL. The anode chamber (empty volume of 35 mL) was separated from the DC by a cation exchange membrane (Nafion 211). On the opposite side, the cathode chamber (empty volume of 35 mL) was separated from the desalination chamber by an anion exchange membrane (Fumatech). On one side of the cathode chamber, the cathode was screwed to the plastic support exposing one face to the cathode solution and one face directly to air. The anode chamber was filled with a solution composed of 50% by volume 100 mM potassium phosphate buffer (K—PB) and 50% by volume activated sludge with the addition of 3 g L$^{-1}$ sodium acetate (NaOAc) as fuel for the electroactive bacteria. The desalination cell was filled with a solution composed of water and sodium chloride at a concentration of 30 g L$^{-1}$ in order to simulate seawater. Finally, the cathode chamber was filled with a solution composed of 50 mM K—PB. The anode chamber had an average conductivity of 10.33±0.4 mS cm$^{-1}$, the desalination cell had intentionally higher solution conductivity measured at 47.6±0.3 mScm$^{-1}$, and the cathode chamber had a solution conductivity of 5.9±0.4 mScm$^{-1}$. These numbers were specifically selected to increase the diffusion and the osmotic gradients between the desalination chamber and the anode and cathode chambers.

The SC-MDCs were run in batch mode and connected to an external resistances of 100Ω for a period of 2 days. Voltage was recorded using a datalog system (Personal DAQ/56). During those two days, periodically, an aliquot of each chamber was removed and pH and solution conductivity were measured using an OMEGA probe for the pH and ThermoScientific Orion Star A112 with a probe able to measure between 0 and 300 mScm$^{-1}$ for the solution conductivity. After measurements, the liquid was reintroduced in the same chamber from which it was removed making sure not to perturb the system.

Polarization curves for the SC-MDC were run through linear sweep voltammetry (LSV) using a two-electrode configuration in which the cathode was the positive electrode (working electrode, WE) and the anode was the negative electrode (counter CE and reference RE electrode). Polarization curves were run between open circuit voltage (OCV) and 0 mV. Power curves were then obtained using the equation P=V×I. Power density and current density were represented in function of the geometric cathode area (7 cm$^2$) that actually corresponds to the AEM and CEM area.

Electrochemical measurements on the SC-MDC were carried out using a BioLogic SP-50 potentiostat. The SC-MDC was set up using a three-electrode setup with the cathode as the working electrode, the anode as a counter electrode and an Ag/AgCl (3M KCl, +210 mV vs. SHE) reference electrode set in the desalination chamber. In order to diminish the cathode losses, an AdE was short-circuited with the cathode and the cell configuration was then called SC-MDC-AdE.

Complete galvanostatic discharge (GLV) curves were performed at various discharge currents (i) while the anode and cathode potentials were monitored vs the reference electrode. After each pulse, the SC-MDC (or SC-MDC-AdE) was set in rest conditions until the original $V_{max,OC}$ was restored and the internal SC-MDC was self-recharged.

Results

Figure 11A:
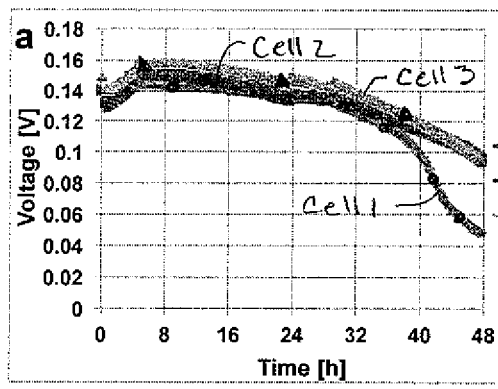
FIG. 11A is a graph of the voltage trend of SC-MDC and SC-MDS-AdEs of the present disclosure measured over a resistance of 10, 100, and 1000 ohm.
Figure 11B:
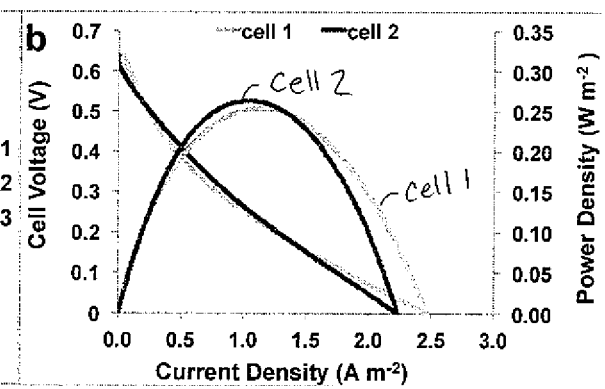
FIG. 11B is a graph of polarization and power curves of SC-MDC and SC-MDS-AdEs of the present disclosure taken at the beginning of a set of experiments.
Figure 11C:
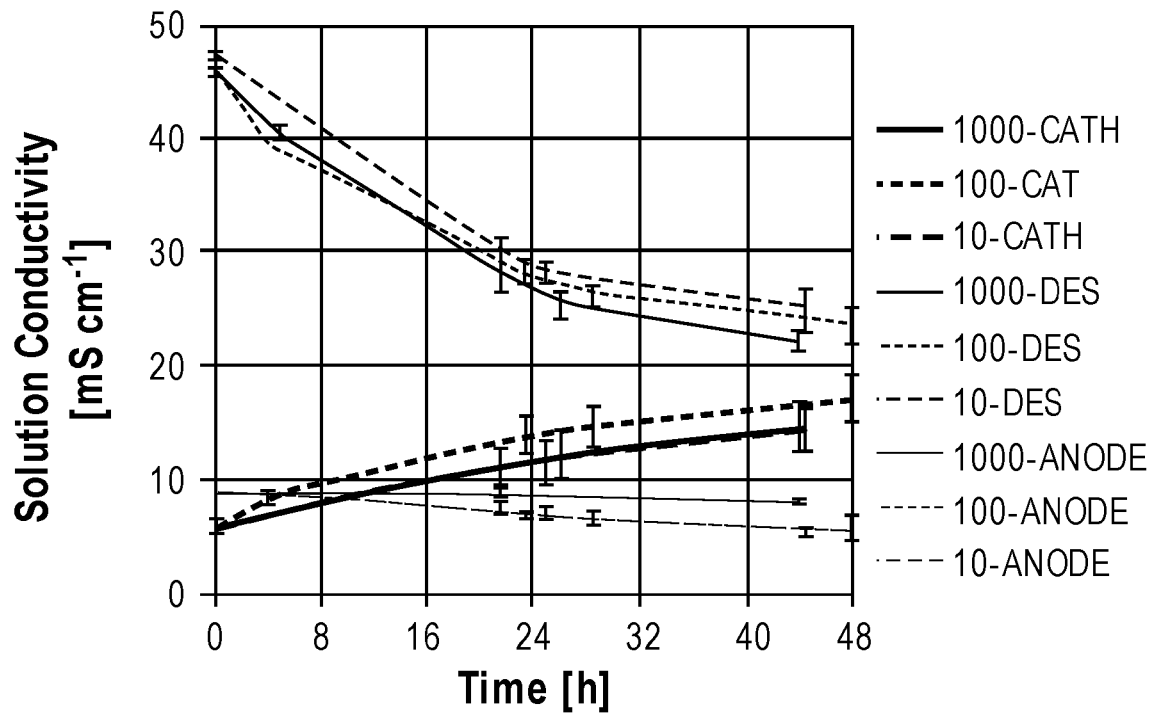
FIG. 11C is a graph of solution conductivity of SC-MDC and SC-MDS-AdEs of the present disclosure measured during the experiments referred to in FIG. 11B.
Figure 11D:
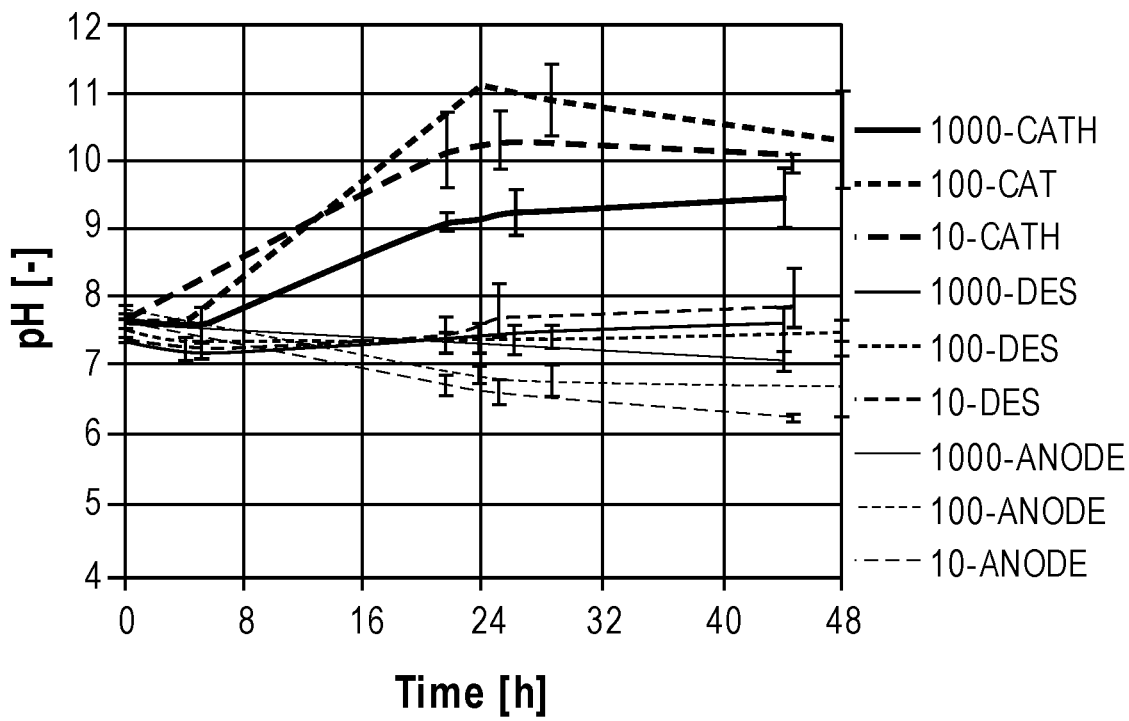
FIG. 11D is a graph showing the pH trends in the cathode, desalination and anode chambers SC-MDC and SC-MDS-AdEs of the present disclosure during the experiments referred to in FIG. 11B.

FIG. 11A shows the voltage trend measured over a resistance of 100 ohm. FIG. 11B shows polarization and power curves taken at the beginning of the experiments. FIG. 11C shows solution conductivity and FIG. 11D shows the pH trends in the cathode, desalination and anode chamber during the experiments.

The SC-MDCs (or SC-MDC-AdEs) were run for 48 hours and cell voltage (FIG. 11A), polarization and power curves (FIG. 11B), solution conductivity (FIG. 11C) and pH (FIG. 11D) were measured during the experiments which were run in triplicate.

When the SC-MDC was connected to an external resistor ($R_{ext}$) of 100 ohm, the cell voltage recorded was roughly around 0.14-0.15 V (FIG. 11A). Polarization and power curves measured initially showed a power peak of 0.23±0.02 W m$^{-2}$ and a maximum current achieved of 2.35±0.11 A m$^{-2}$.

Interestingly, the solution conductivity of the desalination chamber decreased dramatically from an initial value of 47.6±0.3 mS cm$^{-1}$ to 32.4±1.4 mS cm$^{-1}$ after 4 h (FIG. 11C). During an additional 18.5 hours, the solution conductivity further decreased slightly to 26.6±1 mS cm$^{-1}$.

While the solution conductivity of the desalination chamber decreased, solution conductivity of the cathode chamber significantly increased. Particularly, the conductivity of the cathode chamber enhanced from 5.9±0.4 mS cm$^{-1}$ to 10.6±1.5 mS cm$^{-1}$ after 4 h and to 17.3±1 mS cm$^{-1}$ after 22.5 h. Interestingly, the anode chamber conductivity slightly decreased from 10.33±0.4 mS cm$^{-1}$ to 6.25±0.2 mS cm$^{-1}$ at the end of the experiments. This was probably due to the transformation of organics into $CO_2$ or $CH_4$ which involves the release of $H^+$ and an increase in proton concentration in the anode chamber may hinder cation migration and diffusion from the desalination chamber to the anode.

The pH of the anode, desalination, and cathode chambers was also measured over time (FIG. 11D). The pH of the anode chamber decreased one pH unit from 7.9 to 6.5. This was probably due to the production of $H^+$ from the acetate degradation performed by the electroactive bacteria. The pH varied dramatically in the cathode chamber from an initial value of 7.62±0.1 to 11.7±0.3 after 22.5 h and it remained stable till 48 h. This dramatic increase in pH can be attributed to the oxygen reduction reaction (ORR) taking place at the cathode with the formation of $OH^-$. Not just the reduction of ions concentration gradient but also the difference in pH between the desalination chamber and the cathode chamber separated by AEM could contribute to lower the rate of the desalination process. The pH of the desalination cell increased from the initial value of 7.4±0.1 to 10±0.8 after 22.5 hours and then moved to 11±0.7 after 48 hours probably due to diffusion of $OH^-$ from the cathode chamber to the desalination chamber.

Figure 12A:
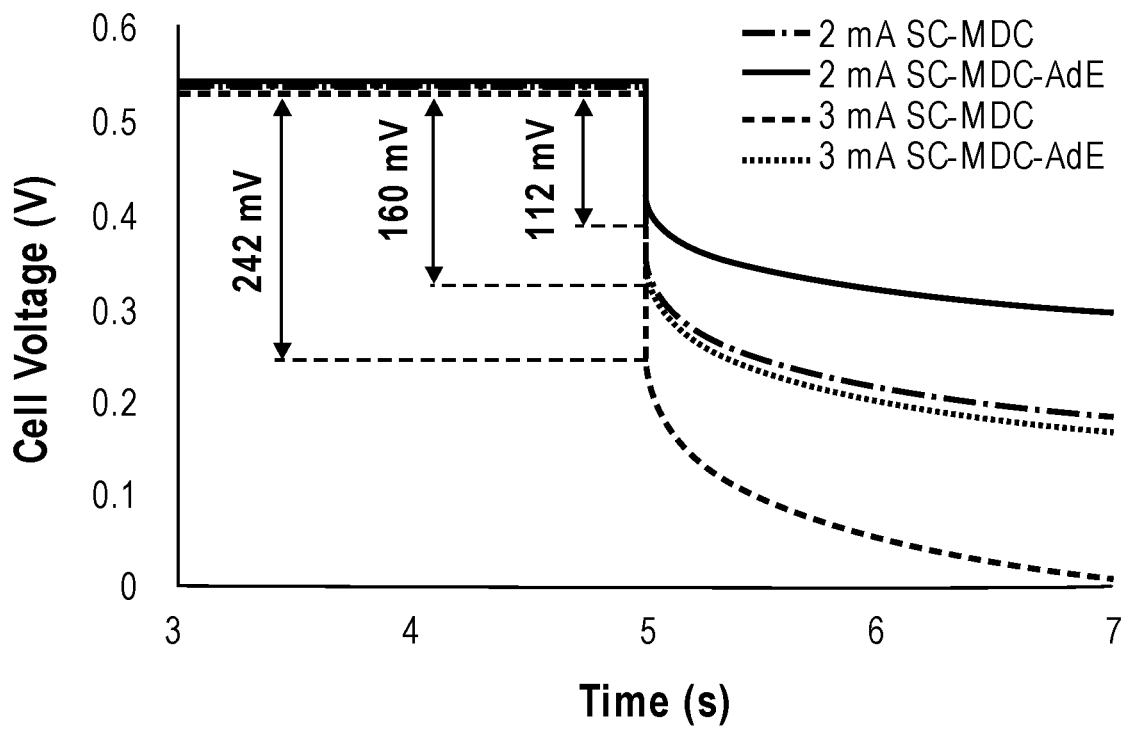
FIG. 12A is a graph of cell voltage profiles of the SC-MDC and SC-MDC-AdE in the experiments referred to in FIG. 11B under 5 s rest and 2 s pulses at $i_{pulse}$ of 2 and 3 mA.
Figure 12B:
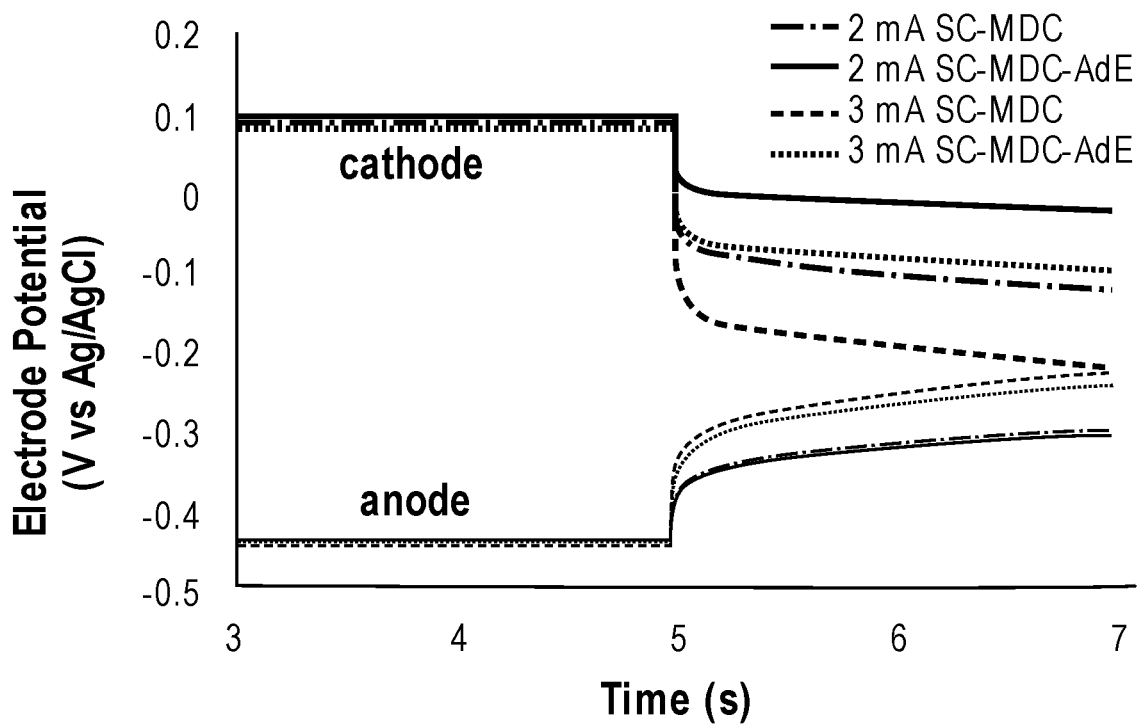
FIG. 12B is a graph of electrode potential profiles of the SC-MDC and SC-MDC-AdE of the SC-MDC and SC-MDC-AdE in the experiments referred to in FIG. 11B under 5 s rest and 2 s pulses at $i_{pulse}$ of 2 and 3 mA.

FIGS. 12 A and B show cell voltage (FIG. 12A) and electrode potential (FIG. 12B) profiles of the SC-MDC and SC-MDC-AdE under 5 s rest and 2 s pulses at $i_{pulse}$ of 2 and 3 mA. GLV discharges were performed at $i_{pulse}$ of 2 mA (2.9 A m$^{-2}$) and 3 mA (4.3 A m$^{-2}$). The data show that the addition of an AdE results in an increase in performance due to decrease in ohmic resistance. In fact, the SC-MDC had a $\Delta V_{ohmic}$ of 160 mV and 242 mV at $i_{pulse}$ of 2 mA and 3 mA respectively. Those values decreased with the addition of the AdE, in fact SC-MDC-AdE had a $\Delta V_{ohmic}$ of 112 mV and 160 mV at $i_{pulse}$ of 2 mA and 3 mA respectively. The ESR was decreased from 80Ω (SC-MDC) to 54Ω (SC-MDC-AdE). The overall capacitance also increased due to the AdE with capacitance measured as 10 mF for SC-MDC and 15 mF for SC-MDC-AdE.

The electrode profiles confirm that the AdE substantially decreases the cathode ohmic losses leaving the anode performance untouched (FIG. 12B). Particularly, $R_{cathode}$ decreased from 56Ω (SC-MDC) to 35Ω (SC-MDC-AdE) while the $R_{anode}$ remained stable at 21±1Ω. Also the cathode capacitance was affected by the AdE. In fact, the capacitance doubled from 22 mF (SC-MDC) to 44 mF (SC-MDC-AdE) while the anode capacitance remained stable (21±3 mF).

Figure 13A:
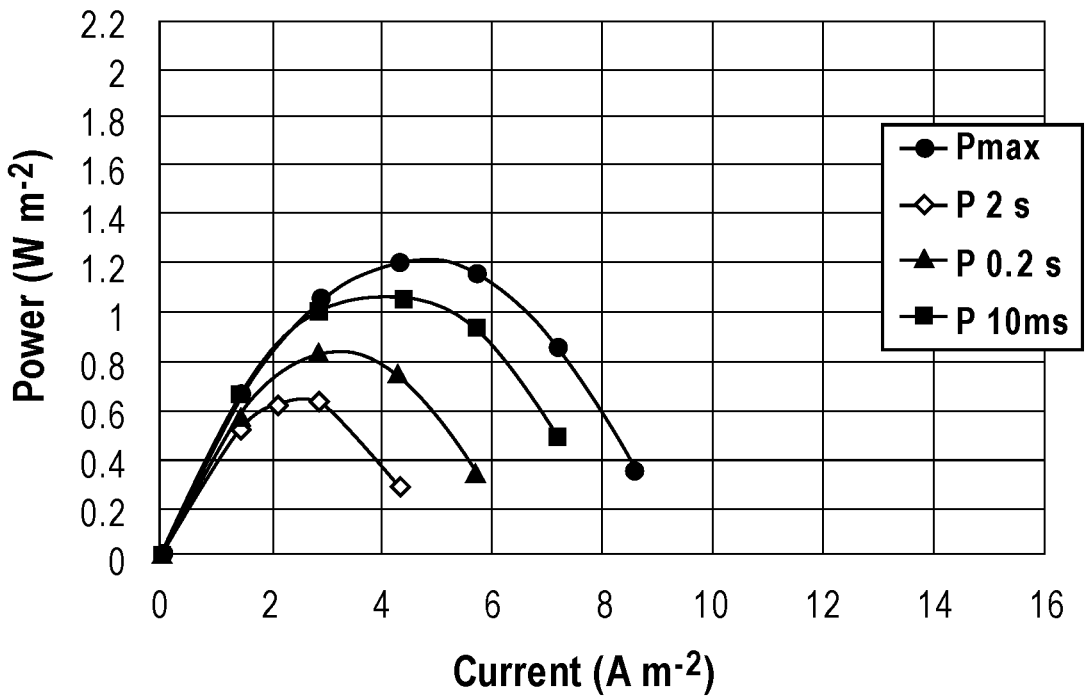
FIG. 13A shows GLV discharges performed on the SC-MDC referred to in FIG. 11B at different $i_{pulse}$ and $P_{max}$ and $P_{pulse}$ for $t_{pulse}$ of 2 s, 0.2 s and 0.01 s.
Figure 13B:
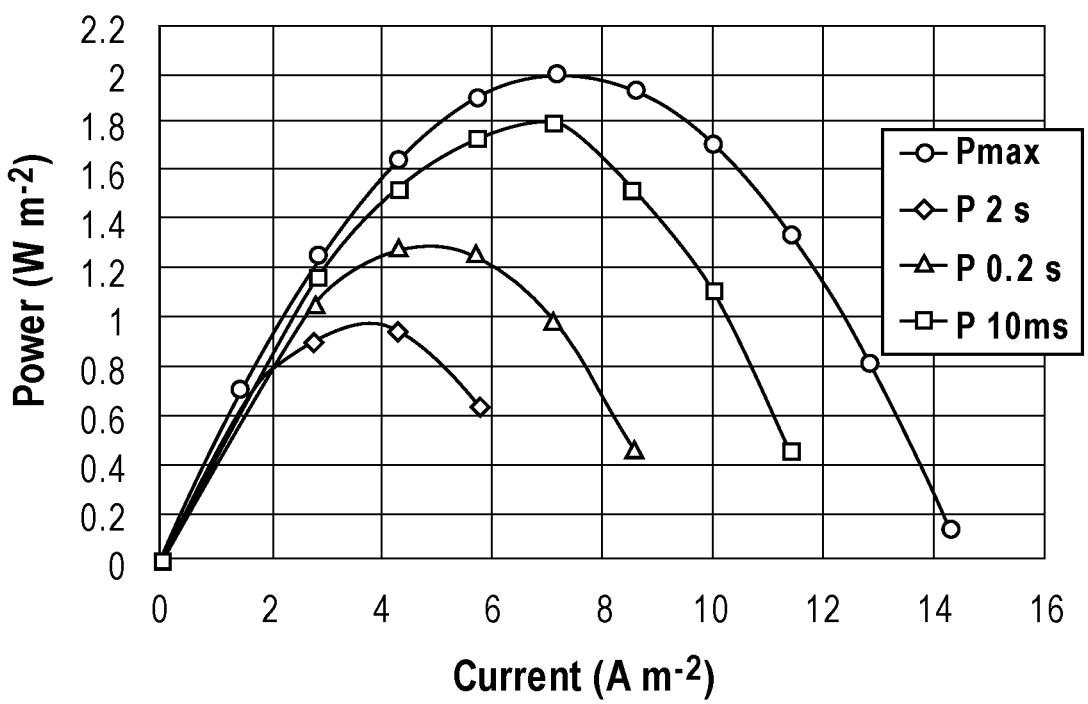
FIG. 13B shows GLV discharges performed on the SC-MDC-AdE referred to in FIG. 11B at different $i_{pulse}$ and $P_{max}$ and $P_{pulse}$ for $t_{pulse}$ of 2 s, 0.2 s and 0.01 s.

GLV discharges performed on the SC-MDC and SC-MDC-AdE at different $i_{pulse}$ and $P_{max}$ and $P_{pulse}$ for $t_{pulse}$ of 2 s, 0.2 s and 0.01 s are presented in FIGS. 13 A and 13B, respectively. $P_{max}$ was calculated at different current densities with a $V_{max}$ of 0.54V and an ESR of 80Ω for the SC-MDC and 54Ω for the SC-MDC-AdE. The highest $P_{max}$ for the SC-MDC was 1.2 W m$^{-2}$ (0.85 mW) which was measured for a current pulse of 4.3 A m$^{-2}$ (3 mA). $P_{max}$ increased by 60% with the SC-MDC-AdE achieving 2 W m$^{-2}$ (1.4 mW) at $i_{pulse}$ of 7.2 A m$^{-2}$ (5 mA). Those values are much higher than any power reported in MDC in literature. $P_{pulse}$ lowered with the increase of $t_{pulse}$ due to the cell capacitive response that diminishes the cell voltage over time ($\Delta V_{capacitive}$). $P_{pulse}$ for the SC-MDC had the highest values of 0.63 W m$^{-2}$ (0.44 mW) at $i_{pulse}$ of 2.85 A m$^{-2}$ (2 mA) for $t_{pulse}$ of 2 s, 0.84 W m$^{-2}$ (0.59 mW) at $i_{pulse}$ of 2.85 A m$^{-2}$ (2 mA) for $t_{pulse}$ of 0.2 s and 1.06 W m$^{-2}$ (0.74 mW) at $i_{pulse}$ of 4.28 A m$^{-2}$ (3 mA) for $t_{pulse}$ of 0.01 s. Higher $P_{pulse}$ quantified in an advantage of 60% was achieved by the SC-MDC-AdE. Particularly, $P_{pulse}$ for t pulse of 2 s was 0.96 W m$^{-2}$ (0.67 mW) at $i_{pulse}$ of 4.28 A m$^{-2}$ (3 mA), for time pulse of 0.2 s was 1.29 W m$^2$ (0.9 mW) at $i_{pulse}$ of 4.28 A m$^{-2}$ (3 mA) and for t pulse of 0.01 s was 1.74 W m$^{-2}$ (1.22 mW) at $i_{pulse}$ of 5.7 A m$^{-2}$ (4 mA).

Figure 14A:
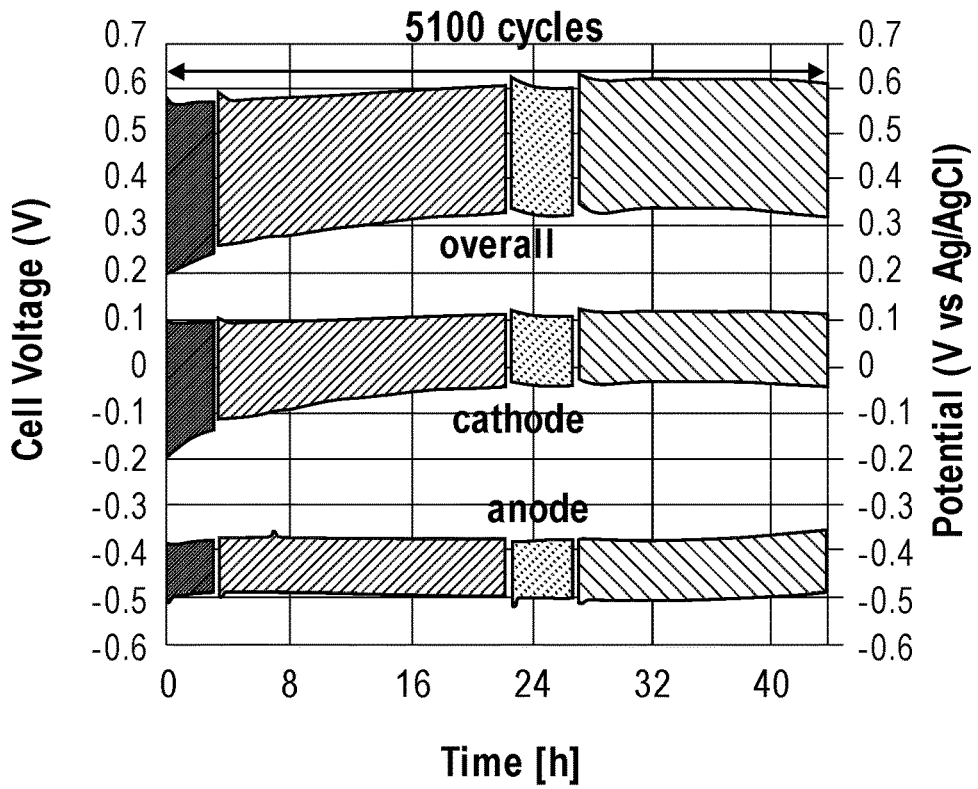
FIG. 14A shows durability test results on the SC-MDC.
Figure 14B:
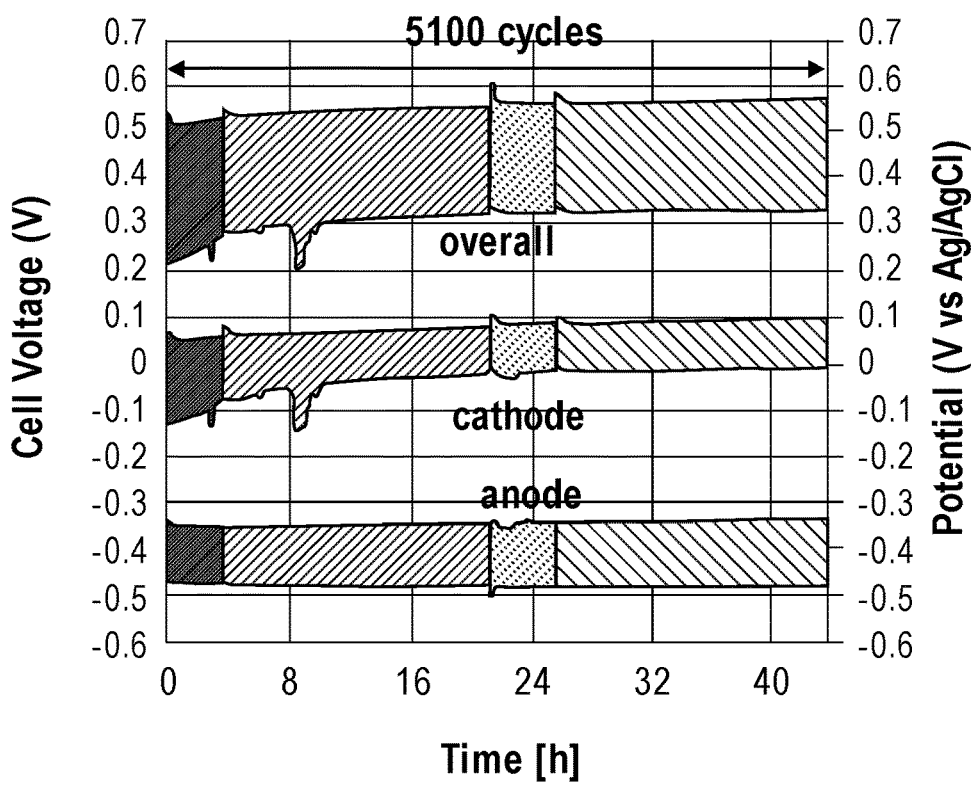
FIG. 14B shows durability tests results on the SC-MDC-AdE.

FIGS. 14A-B show durability test results on SC-MDC (FIG. 14A) and SC-MDC-AdE (FIG. 14B) configurations. The tests were performed for 44 hours. During that time, 5100 discharge/self-recharge cycles were run for the SC-MDC at $i_{pulse}$ of 3 A m$^{-2}$ for $t_{pulse}$ of 1 s and 30 s were necessary to restore the initial cell voltage. 7400 discharge/self-recharge cycles were run for the SC-MDC-AdE at $i_{pulse}$ of 3 A m$^{-2}$ for $t_{pulse}$ of 1 s, but in this case, only 20 s were necessary to restore the initial cell voltage. This was probably due to the lower ESR and, thus, time constant (ESR× Capacitance) of the SC-MDC-AdE (FIG. 14B) that allowed a faster recovery of initial voltage values. The SC-MDC was able to perform just 2 discharge/self-recharge steps in 60 second while the SC-MDC-AdE performed 3 of them in the same time. The $V_{max, oc}$ of the SC-MDC and of the SC-MDC-AdE increased slightly over time. Separate electrode analysis showed that the voltage increase was mainly due to the improvement of cathode performances over time.

Figure 15A:
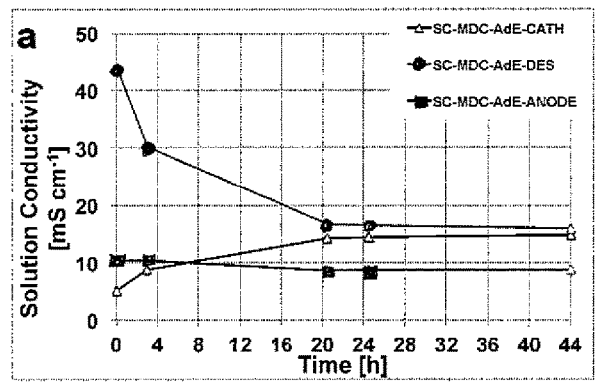
FIG. 15A shows the solution conductivity trend in the cathode, desalination and anode chambers for the SC-MDC and SC-MDC-AdE of the present disclosure during experimentation.

As shown in FIG. 15A, the change of the resistance and the capacitance of the cathode and consequently the overall cell's were due to the change of ionic composition of the cathode chamber. Also in this case, the solution conductivity in the DC decreased significantly in the first 24 hours and then the desalination rate decreased due to the diminish in ions gradient. The solution conductivity of the anode chamber remained constant during the experiments. The solution conductivity of the cathode chamber increased up to 15 mS cm$^{-1}$ after 44 h. The fact that the solution conductivity in the cathode chamber increased can explain the $R_{cathode}$ decrease and $C_{cathode}$ increase measured over time. The lowest solution conductivity in the DC achieved in those experiments was achieved by the SC-MDC-AdE with 30.3 mS cm$^{-1}$ after 3 h and 16 mS cm$^{-1}$ after 44 h. Also the SC-MDC had a slightly lower solution conductivity in the desalination chamber compared to MDCs previously presented.

Figure 15B:
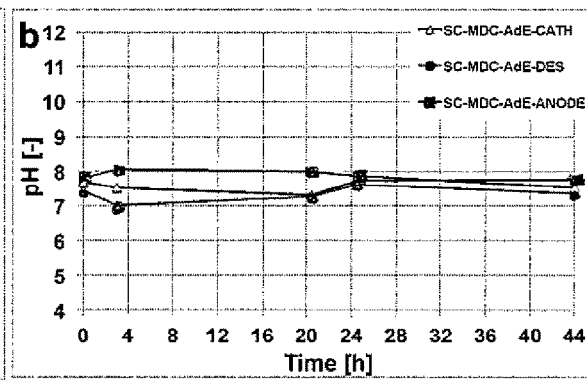
FIG. 15B shows the solution pH trend in the cathode, desalination and anode chambers for the SC-MDC and SC-MDC-AdE during experimentation.

Interestingly, as shown in FIG. 15B, pH did not vary at all during the experiments, remaining between 7.2 and 8. This is exactly the opposite result compared to the previously presented variation in pH taking place in the anode and cathode chambers of the MDCs (FIG. 11D). In fact, in an MDC, at the anode, $H^+$ is produced by the oxidation of organics resulting in a lower pH in the chamber; at the cathode, OH— is produced due to the ORR resulting in an increase in pH. Substantial variations in pH are known to slow down, or even stop, the desalination process. However, the supercapacitive MDC in rest utilized the equilibrium redox potentials of the carbonaceous bio-anode and air breathing cathode to negatively and positively polarize the electrode surfaces and form double layers at each electrode/electrolyte interface so as to store electrostatically the charges that are delivered during the subsequent discharge pulse. Because this process is based simply on the attraction or rejection of charges, and, specifically, of the dissolved ions, there is no production of reaction products that can alter the pH.

II. Smart Series Connection of SC-MFCs

SC-MFC Materials and Methods

Four identical glass bottles of 125 mL volume were used during the experiments. A single chamber microbial fuel cell (MFC) configuration with an air-breathing cathode was used. Lateral holes accommodated cathodes that were screwed to the bottles so that one side contacted the solution while the other side contacted the atmosphere. The cathode had a geometric area exposed to the solution of 2.9 cm$^2$. The bottle was filled with 50% in volume of 0.1M potassium phosphate buffer saline (K—PBS) solution and 0.1M of potassium chloride (KCl) and 50% in volume of activated sludge from the Albuquerque water treatment plant. Sodium acetate in a concentration of 3 g L$^{-1}$ was used to feed the electroactive bacteria.

The anode electrode was a carbon brush (Millirose, USA) with diameter of 3 cm and height of 3 cm. The experiment was conducted with the anode already colonized by electroactive bacteria in MFCs that had been running for at least 6 months. An additional electrode short-circuited to the cathode was also a carbon brush of dimension 2×2 cm. The additional electrode was coated with activated carbon (AC, SX Ultra Norit, USA) in order to increase the capacitance of the electrode as previously described. The additional electrodes were sterile at the beginning of the experimentation.

The cathode had an air-breathing configuration composed by a mixture of AC (SX Ultra, USA), carbon black (CB, Alfa Aesar), polytetrafluoroethylene (PTFE, 60 wt % solution Sigma Aldrich) and iron-aminoantipyrine (Fe-AAPyr). Particularly, AC, CB and PTFE were mixed into a coffee grinder in weight percentages of 70, 10 and 20% respectively. After 2 minutes of continuous grinding, the black mixture was inserted on a stainless steel mesh used as a current collector into a metallic die and the Fe-AAPyr was added and mixed with the existing powder. The die was pressed at 2 mT for 5 minutes under a hydraulic press (Carver, USA). AC, CB and PTFE loading was 40±2 mg cm$^{-2}$ and the Fe-AAPyr loading was 1.5±0.1 mg cm$^{-2}$.

Three different catalyst materials were used in the additional electrode short-circuited for the hydrogen evolution reaction (HER). Particularly, Pt was tested as a control and Fe-AAPyr and Fe-MBZ (Fe-Mebendazole) were tested as PGM-free catalysts. To the best of our knowledge, Fe- AAPyr and Fe-MBZ have never been used as catalysts for HER in neutral media. Toray carbon paper was used as a substrate for the HER electrodes. The inks were prepared by mixing either Fe-AAPyr or Fe-MBZ (120 mg each) with 45 wt %) Nafion® ionic liquid (DuPont) and isopropanol and then sonicating the mixture for at least 1 hour. An air brush was used to spray the ink directly onto the carbon paper. The carbon paper was set up on a hot plate (T=60° C.) enhancing the fast evaporation of the isopropanol in order to dry the electrode. Fe-AAPyr and Fe-MBZ loading was 5±0.5 mg cm$^{-2}$, while Pt had a loading of 0.5±0.05 mg cm$^{-2}$. The cathode was connected to a plastic covered copper wire and the contact was glued using an epoxy resin while avoiding exposure of the copper wire to the solution.

Electrochemical Measurements

A BioLogic SP-50 potentiostat was used to carry out electrochemical measurements. Particularly, galvanostatic discharge curves were performed at different currents with a discharge time ($t_{pulse}$) of 2 s and 10 ms. The four SC-MFCs were tested singularly using a three-electrodes technique in which the reference electrode was Ag/AgCl (3M KCl, +210 mV vs. SHE), the anode was the counter electrode and the cathode was the working electrode. Each SC-MFC was kept in rest conditions (Open Circuit Voltage, OCV or $V_{max,OC}$) until a stable condition was reached and then the GLV discharge was applied. After the discharge, the SC-MFC recovered the initial OCV value and equilibrium conditions were restored, recharging the device.

When the discharge pulse is applied, the voltage drops vertically to a lower value ($V_{max}$) that was actually the practical value of the voltage at which energy and power can be obtained. Those ohmic losses ($\Delta V_{ohmic}$) quantified as the difference between $V_{max,OC}$ and $V_{max}$ are due to the equivalent series resistance (ESR) of the MFC caused by the electrodes and the electrolyte. ESR can be calculated as the ratio between the ohmic losses ($\Delta V_{ohmic}$) and the current applied during the pulse (i). The utilization of the three-electrode technique allows for the monitoring of each electrode potential during discharge and the evaluation of the anode and cathode overpotentials which contribute to $\Delta V_{ohmic}$. Anode and cathode ohmic losses are, in turn, used to evaluate the anode ($R_{anode}$) and cathode ($R_{cathode}$) resistances that contribute to ESR.

During MFC discharge both ORR and electrostatic discharge of polarized carbon surfaces (anode and cathode) take place. Given that the kinetics of ORR are much slower than the electrostatic process, at high current pulses and short times, the MFC response is mainly driven by the electrostatic, capacitive discharge. In this case, after the initial ohmic drop ($\Delta V_{ohmic}$), the cell voltage decreases with a smoother slope during discharge ($\Delta V_{capacitive}$). The ratio between the current pulse (i) and the slope (s, dV/dt) during the voltage decrease represents the capacitance of the SC-MFC. In order to have higher energy/power, $\Delta V_{ohmic}$ and $\Delta V_{capacitive}$ should be minimized and ESR minimized and capacitance maximized.

Power curves were constructed considering the maximum power output ($P_{max}$) and the power obtained after pulses ($P_{pulse}$) of 2 s and 10 ms. Particularly, $P_{max}$ was calculated by multiplying $V_{max}$ and the current pulse ($i_{pulse}$). $P_{pulse}$ was calculated as the ratio between the energy produced during a pulse ($E_{pulse}$) and $t_{pulse}$. $E_{pulse}$ was calculated as the area under the discharge curve between $V_{max}$ and $V_{finalpulse}$.

$$E = i \int_0^t V dt$$

Four MFCs were then connected in series to boost up the operating voltage for practical application. The series connection was possible due to the hydraulic (ionic) disconnection between the working MFCs. Galvanostatic (GLV) discharges were done after the MFCs in rest conditions (Open Circuit Voltage, OCV) reached a stable voltage with $t_{pulse}$ of 2 s and 10 ms. In this case, 2-electrodes (positive electrode=C4, negative electrode=A1) discharges were performed. $P_{max}$ and $P_{pulse}$ curves were then calculated as previously described.

Finally, an additional electrode for the hydrogen evolution reaction ($Ad_{HER}$) was short-circuited to A1 and inserted in MFC4. This connection drove HER potentials at low values. If redox processes are not taking place (e.g. in the presence of non-aqueous, aprotic media) this connection should bring $Ad_{HER}$ to A1+A2+A3+A4 potential, i.e. ca. −2 V vs R4. Practically, in aqueous, anaerobic environment the lowest feasible potential for $Ad_{HER}$ is set by the potential at which the electrocatalytic hydrogen evolution occurs. In this configuration two tests were performed after HER was stabilized: i) the potential of the $Ad_{HER}$ electrode vs Ag/AgCl (R4) was monitored over time while measuring the current flowing between C4 and $Ad_{HER}$ ($i_{HER}$); ii) galvanostatic discharges (using C4 as positive electrode and A1 as negative) were simultaneously performed while HER was taking place.

Hydrogen Evolution Reaction Measurements

Hydrogen evolution reaction (HER) was measured separately using a three-electrode technique (gas diffusion electrode as the working electrode, platinum wire as the counter electrode and Ag/AgCl (3M KCl, +210 mV vs. SHE) as the reference electrode) in a glass chamber with a volume of 100 mL. Pt, Fe-AAPyr, Fe-MBZ and carbon paper (CP) electrodes (where CP was used as a control) were immersed in a PBS solution (0.1M with 0.1M KCl) overnight. The vial was hermetically sealed and nitrogen was purged vigorously for 30 minutes before starting the experiments. Linear Sweep Voltammetry (LSV) between open circuit potential (OCP) and −2 V vs Ag/AgCl was run at a scan rate of 1 mV s$^{-1}$ in triplicate. The LSV was used to quantify the hydrogen produced through the Faradic yield using the recorded voltage of the additional electrode.

Particularly, the molar flow of hydrogen was determined following the eq. 1:

$$\dot{n} = \frac{2 \times iHER}{F}$$

where $\dot{n}$ is the molar rate (mol s$^{-1}$) of hydrogen production, 2 is the number moles of electrons necessary to generate 1 mole of hydrogen, $i_{HER}$ is the HER current (A) and F is the Faraday constant 96485 (C mol$^{-1}$). The Faradaic yield was showed as mol d$^{-1}$ cm$^{-2}$ in which mol d$^{-1}$ is the flow of hydrogen referred to the geometric area of the $Ad_{HER}$.

Results and Discussion

Figure 16A:
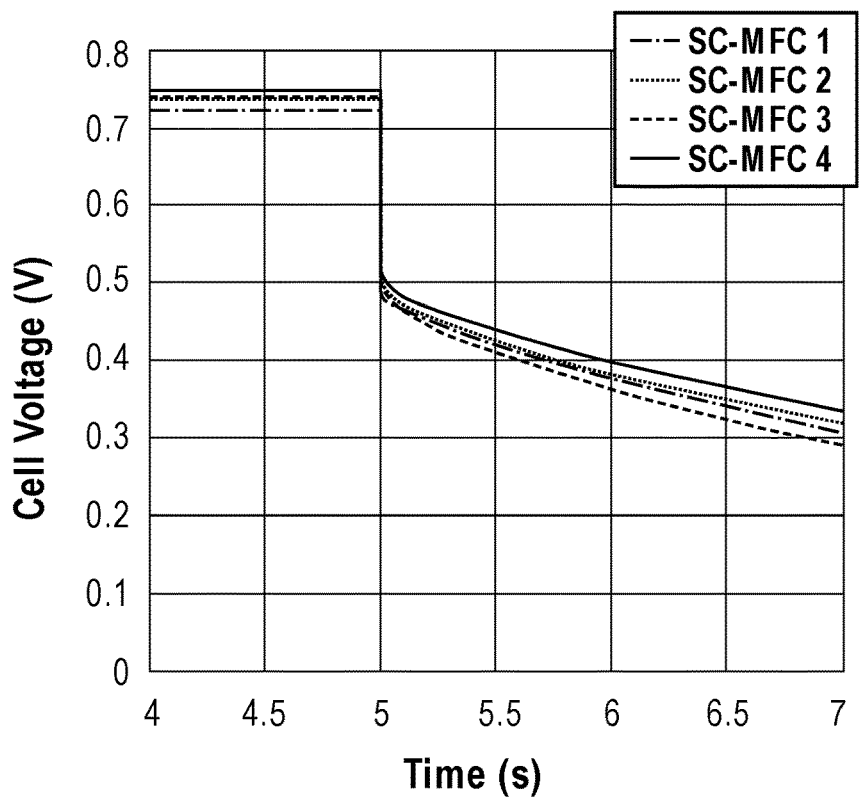
FIG. 16A shows the cell voltages of four SC-MFCs of the present disclosure connected in series.
Figure 16B:
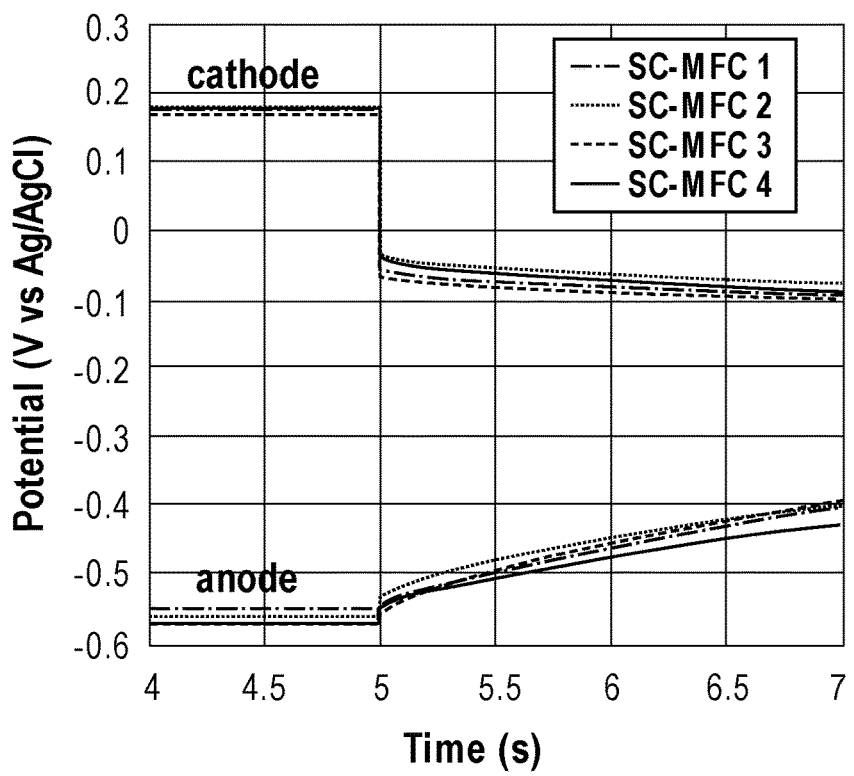
FIG. 16B shows the anode-cathode potential trends of the connected-in-series SC-MFCs.

Four SC-MFCs were tested using GLV discharges and the cell voltage (FIG. 16A) and the anode-cathode potential trends (FIG. 16B) for $t_{pulse}$ of 2 s is shown. The behaviors of the four separate cells were very similar. The SC-MFCs exhibited a $V_{max,OC}$ of 740±10 mV resulted from a contribution of +173±5 mV (vs Ag/AgCl 3M KCl) of the cathode and −564±11 mV (vs Ag/AgCl 3M KCl) of the anode. The overall discharge with $i_{pulse}$ of 3 mA showed a $\Delta V_{ohmic}$ of 230±6 mV corresponding of an ESR of 77±2Ω. This was mainly due to the cathode where cathode ohmic drop contributed roughly 95% to $\Delta V_{ohmic}$. Moreover, the capacitance of the cell ($C_{cell}$) can be extrapolated by the measurements done in FIG. 16A. Overall $C_{cell}$ was 15.7±1.1 mF resulting from a $C_{cathode}$ of 70.5±9 mF and a $C_{anode}$ of 20±2 mF.

Figure 17A:
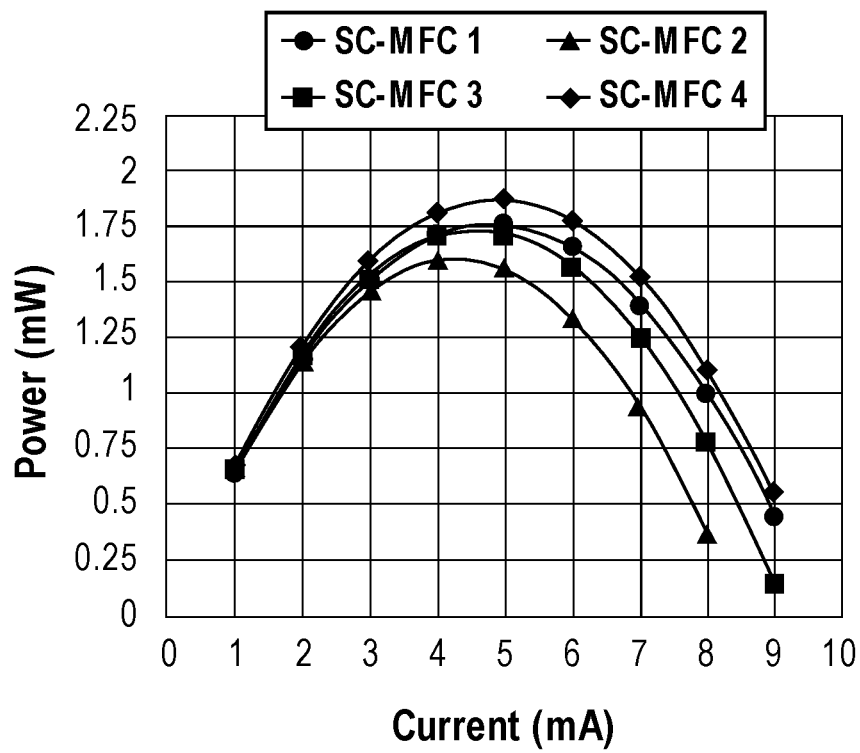
FIG. 17A shows power curves built from the discharge curves at 3 mA for OCV of 737±10 mV and ESR of 77±2Ω. $P_{max}$ of 1.75 mW (at 5 mA), 1.675 mW (at 4 mA), 1.72 mW (at 5 mA) and 1.865 mW (at 5 mA) for SC-MFC1, SC-MFC2, SC-MFC3 and SC-MFC4 of the connected-in-series SC-MFCs.
Figure 17B:
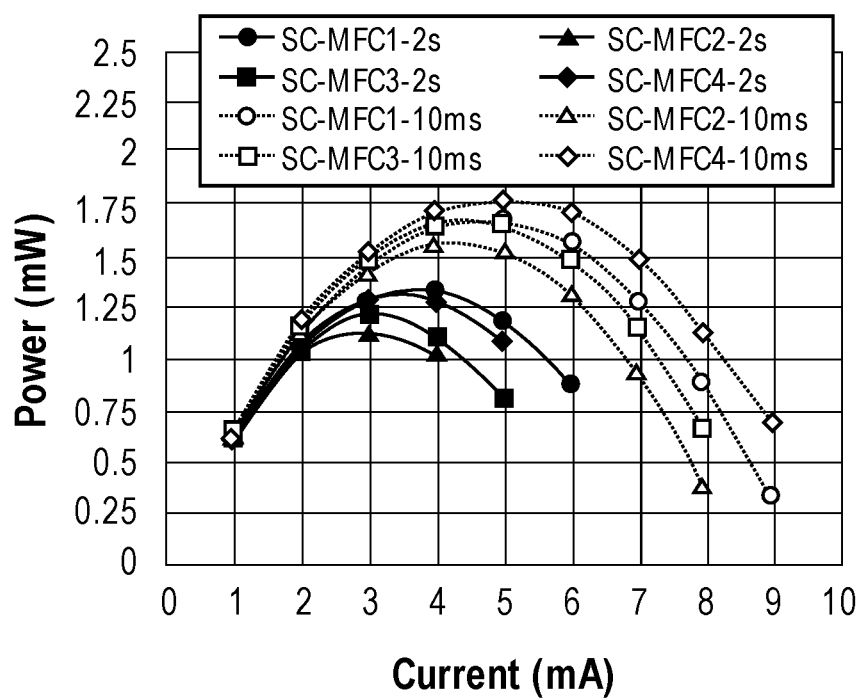
FIG. 17B power curves built from the discharge curves at 3 mA for OCV of 737±10 mV and ESR of 77±2Ω. $P_{max}$ of 1.75 mW (at 5 mA), 1.675 mW (at 4 mA), 1.72 mW (at 5 mA) and 1.865 mW (at 5 mA) for SC-MFC1, SC-MFC2, SC-MFC3 and SC-MFC4 of the connected-in-series SC-MFCs at different $P_{pulse}$.

Power curves ($P_{max}$) (FIGS. 17A and 17B) were built from the discharge curves at 3 mA considering OCV of 737±10 mV and ESR of 77±2Ω. $P_{max}$ of 1.75 mW (at 5 mA), 1.675 mW (at 4 mA), 1.72 mW (at 5 mA) and 1.865 mW (at 5 mA) was detected for SC-MFC1, SC-MFC2, SC-MFC3 and SC-MFC4 respectively. Maximum current of 8 mA was measured for SC-MFC2 while SC-MFC1, SC-MFC3 and SC-MFC4 were able to reach 9 mA as maximum $i_{pulse}$. $P_{pulse}$ of 10 ms was slightly lower than $P_{max}$ varying between 1.55 mW (SC-MFC2) and 1.77 mW (SC-MFC4). Lower power was then achieved with $t_{pulse}$ of 2 s. In fact, $P_{pulse}$ varied between 1.13 mW (SC-MFC2) and 1.33 mW (SC-MFC1).

Figure 18A:
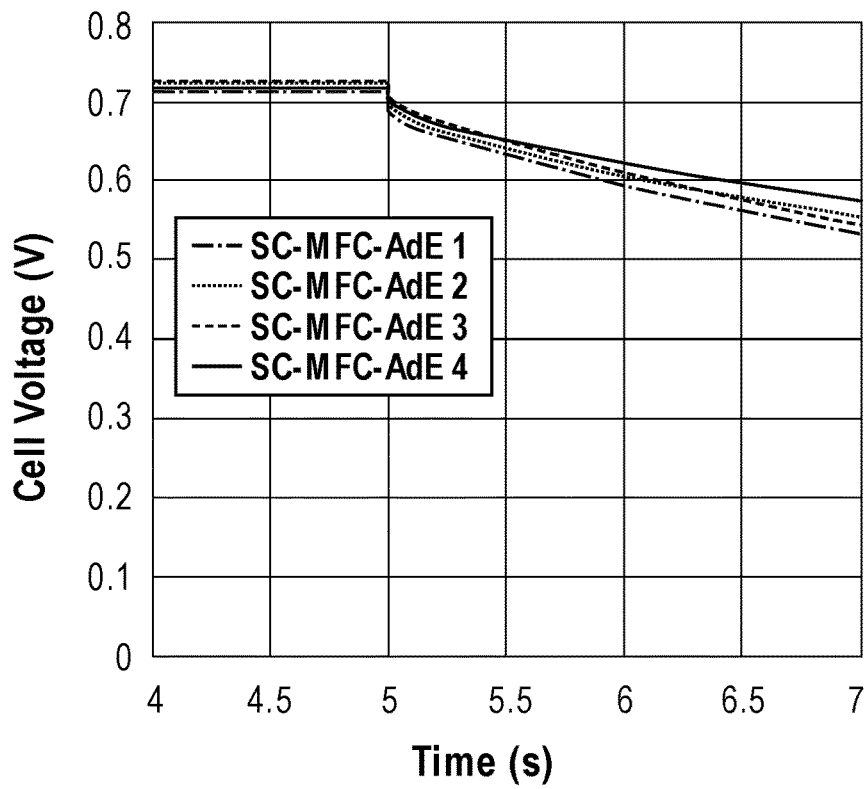
FIG. 18A shows the cell voltage profiles of four different connected-in-series SC-MFC-AdEs according to the present disclosure under 5 s rest and 2 s pulses at 3 mA.
Figure 18B:
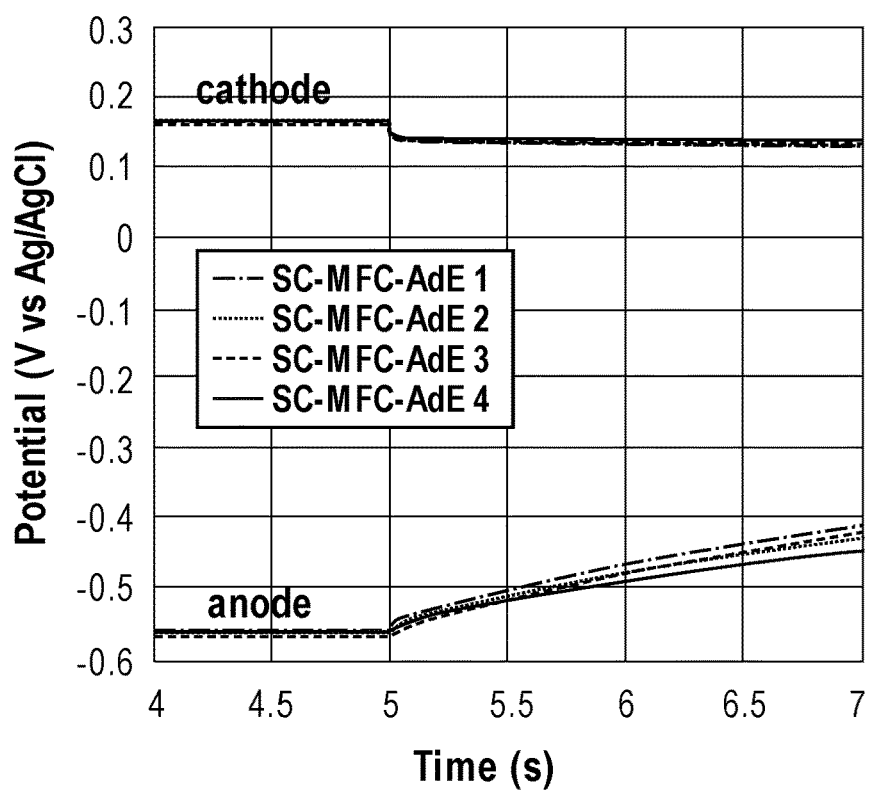
FIG. 18B shows the electrode potential profiles of four different SC-MFC-AdEs under 5 s rest and 2 s pulses at 3 mA.

FIGS. 18A and 18B show the cell voltage (FIG. 18A) and electrode potential (FIG. 18B) profiles of four different SC-MFC-AdEs under 5 s rest and 2 s pulses at 3 mA. An additional electrode (AdE) based on a small brush coated with AC was short-circuited with the cathode and was added in the solution of each of the four SC-MFC to overcome the high cathode ohmic losses. The brush brought the potential of the cathode slightly down to 159±3 mV (vs Ag/AgCl) and consequently the overall cell voltage (720±6 mV) since the anode potential remained almost stable at the level of 558±5 mV. FIG. 18A shows the GLV discharges of each SC-MFC-AdE $t_{pulse}$ of 2 s. The anode and cathode profiles during the discharge are also presented (FIG. 18B). The introduction of the additional electrode (AdE) dramatically decreased the overall ESR to 7.3±1.3Ω. It must be noted that the AdE decreased the overall ESR by one order of magnitude. Finally, the $C_{cell}$ was enhanced to 21±2.5 mF primarily due to an increase in $C_{cathode}$ of 251±22 mF which is three times higher than previously shown.

Figure 19A:
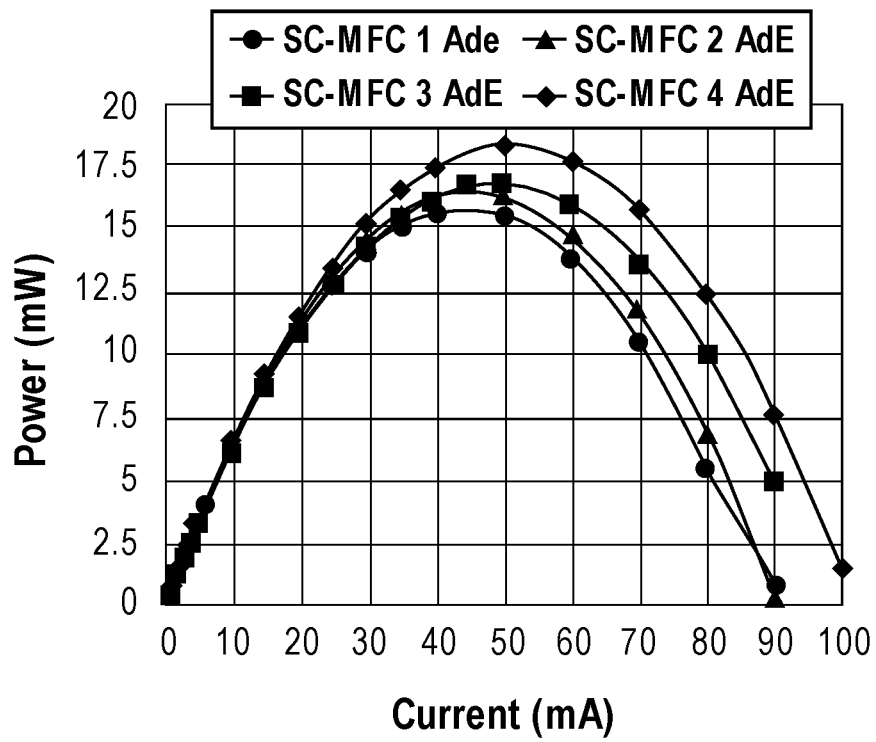
FIG. 19A is a power curve derived from the discharge curves at 3 mA.
Figure 19B:
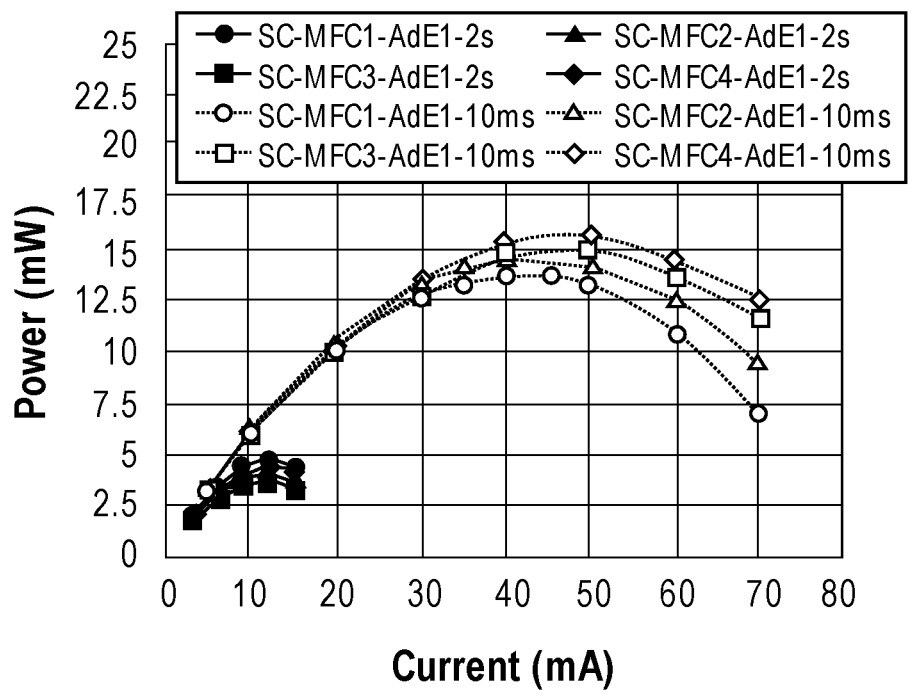
FIG. 19B is a power curve derived from the discharge curves at 3 mA at different $P_{pulse}$.

Power curves ($P_{max}$) (FIGS. 19A and 19B) were derived from the discharge curves at 3 mA. In this case, an OCV of 720±6 mV and ESR of 7.3±1.3Ω were considered. $P_{max}$ of 15.6 mW (at 40 mA), 16.25 mW (at 50 mA), 16.75 mW (at 50 mA) and 18.25 mW (at 50 mA) was detected for SC-MFC-1-AdE, SC-MFC-2-AdE, SC-MFC-3-AdE and SC-MFC-4-AdE respectively. The additional electrode gave an advantage of roughly one order of magnitude for both power and current in which the maximum power has been achieved. The maximum current registered was 90-100 mW, which is roughly 10 times higher compared to the SC-MFC. As expected, the increase in $t_{pulse}$ decreased the power produced. Indeed, $P_{pulse}$ of 10 ms was measured with values between 13.9 mW (SC-MFC-1-AdE) and 15.7 mW (SC-MFC-4-AdE). $P_{pulse}$ decreased further with $t_{pulse}$ of 2 s achieving a minimum value of 3.7 mW (SC-MFC-3-AdE) and a maximum value of 4.6 mW (SC-MFC-4-AdE).

Figure 20A:
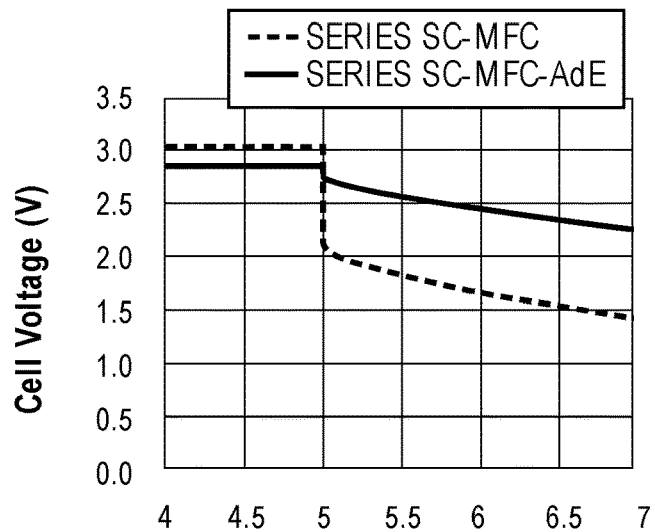
FIG. 20A shows cell voltage profiles for SC-MFCs and SD-MFC-AdEs connected in series.
Figure 20B:
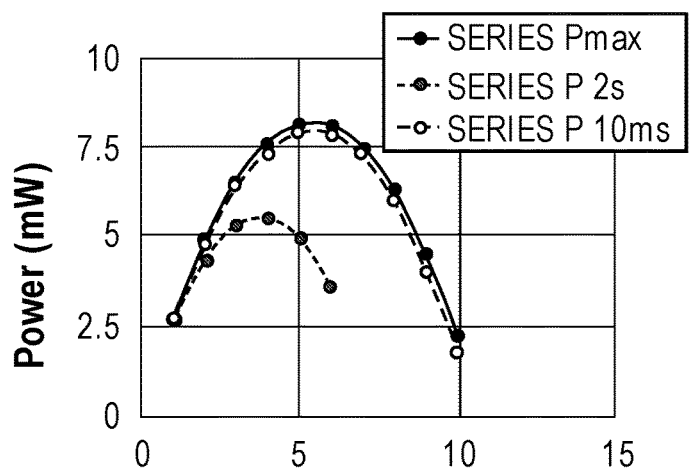
FIG. 20B shows power curves for SC-MFCs connected in series.
Figure 20C:
FIG. 20C shows power curves for SD-MFC-AdEs connected in series.

FIGS. 20A-20C show cell voltage profiles (FIG. 20A) and power curves (FIGS. 20B and 20C) for SC-MFCs and SD-MFC-AdEs connected in series. As expected, the connection in series of the four SC-MFCs or SC-MFC-AdEs boosted up the voltage to roughly four times the single value. SC-MFC-SERIES had a voltage of 3025 mV while SC-MFC-AdE-SERIES had slightly lower value (2865 mV) due to the lower value of each single SC-MFC-AdE. The connection in series is beneficial for boosting up the overall voltage to levels needed to power practical applications. The connection in series was possible due to the hydraulic (ionic) disconnection of the different reactors. In order to evaluate the system, cell discharges at 3 mA were performed. ESR of SC-MFC-SERIES was 300Ω equivalent to an average of 75Ω for each SC-MFC. SC-MFC-AdE-SERIES had an ESR of 39Ω equivalent to an average of 9.5Ω for each SC-MFC-AdE. ESR was similar to the one measured for each single reactor. Power curves were then measured for SC-MFC-SERIES (FIG. 20B) and SC-MFC-AdE-SERIES (FIG. 20C). SC-MFC-SERIES had a $P_{max}$ of 8.1 mW (at 5 mA), $P_{pulse}$ ($t_{pulse}$ 10 ms) of 7.93 mW (at 4 mA) and $P_{pulse}$ ($t_{pulse}$ 2 s) of 5.5 mW (at 4 mA). The results were increased by an order of magnitude with AdE utilization. SC-MFC-AdE-SERIES had a $P_{max}$ of 58 mW (at 40 mA), $P_{pulse}$ ($t_{pulse}$ 10 ms) of 45.9 mW (at 40 mA) and $P_{pulse}$ ($t_{pulse}$ 2 s) of 17 mW (at 12 mA).

Figure 21:
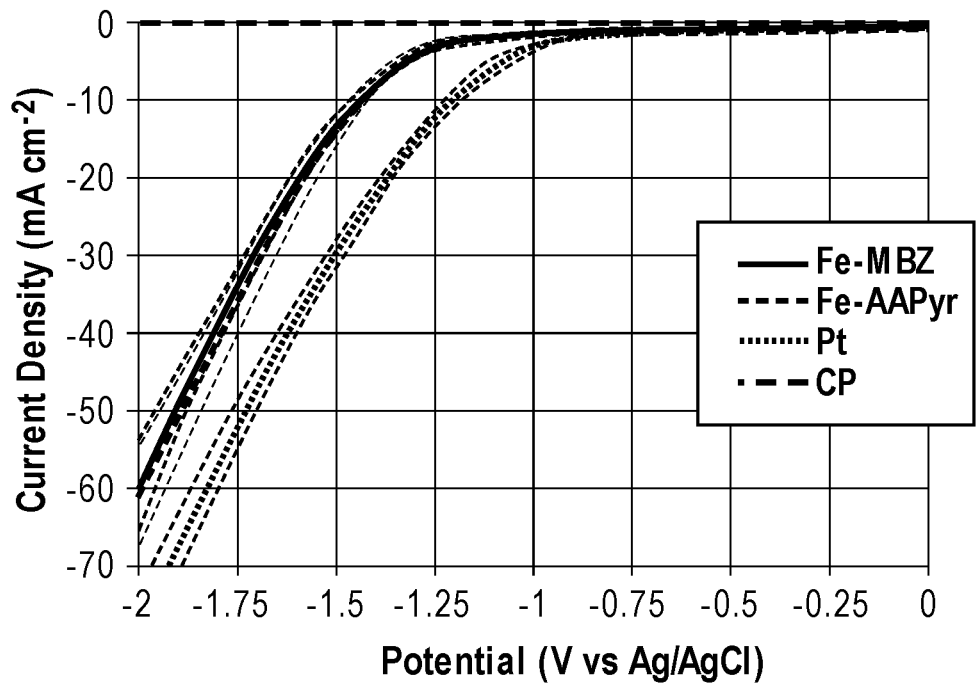
FIG. 21 shows the hydrogen evolution reaction (HER) of Fe-MBZ, Fe-AAPyr, Pt and CP at neutral pH in $N_2$-saturated electrolyte between 0 and −2V vs Ag/AgCl.

FIG. 21 shows the hydrogen evolution reaction (HER) of Fe-MBZ, Fe-AAPyr, Pt and CP at neutral pH in $N_2$-saturated electrolyte between 0 and −2V vs Ag/AgCl. Additional experiments were carried out by a three-electrode setup (K—PB solution, pH=7.5, T=25° C., deaerated electrolyte) to determine HER parameters such as: onset potential, overpotential (in respect to platinum) and voltage at i=20 mA $cm^{-2}$ were performed. As we discussed earlier the neutral conditions cannot be considered favorable for paired reactions (ORR/OER and HOR/HER) due to the fact that protons and hydroxyls are the main reagents in those processes. It is clear that the concentration of $H^+$ and $OH^-$ is the lowest at pHs approaching 7. The results of the HER study are presented in FIG. 21 and it can be clear seen that Pt has the lowest overpotential in the line of materials tested. The onset potential for platinum was recorded as −0.75V and voltage at i=20 mA $cm^{-2}$ was −1.35V. PGM-free electrocatalysts as it was expected have a higher onset in the range of −1V with a voltage at i=20 mA $cm^{-2}$ V=1.52V. In general, the overpotential of PGM-free catalysts was −250 mV shifted compared to platinum, which indicated the need in improvement of that promising class of materials.

Figure 22:
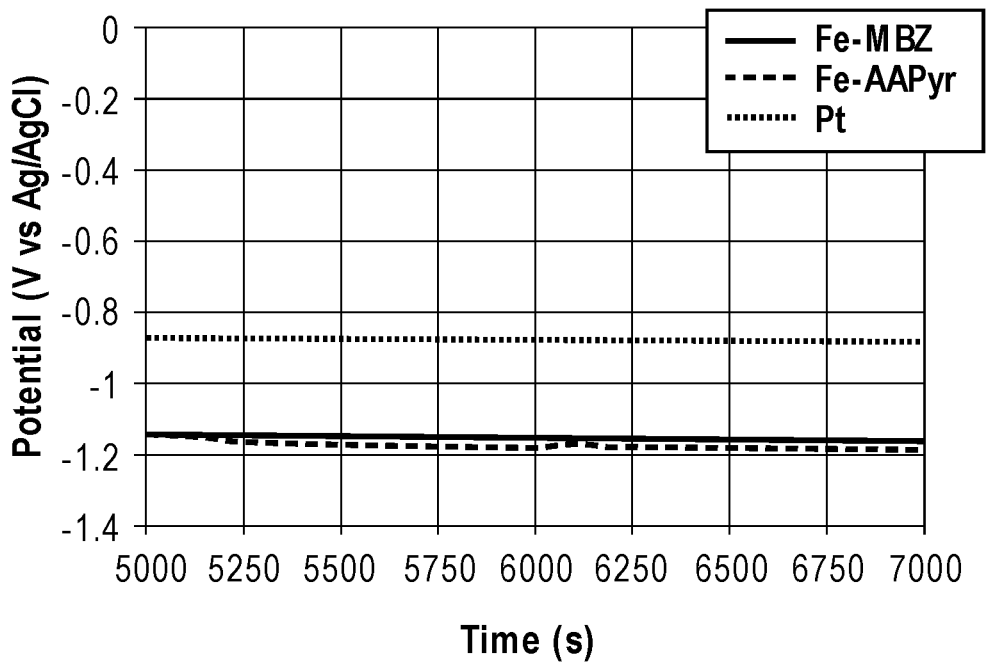
FIG. 22 shows the potential of an $Ad_{HER}$ after an $Ad_{HER}$ electrode was added to the anodic chamber of one of the MFCs in a series of four connected MFCs.

After the $Ad_{HER}$ electrode was added into the anodic chamber MFC4 (FIG. 22) and short circuited with the anode A1, the $Ad_HER$ potential was driven to low values, reaching a stable value after roughly 5000 second. Particularly, Pt stabilized at −0.88V (vs Ag/AgCl) while Fe-AAPyr and Fe-MBZ stabilized at a lower value of −1.17 V (vs Ag/AgCl) and −1.15 V (vs Ag/AgCl), respectively and positive current flowed from C4 to $Ad_HER$. The Faradaic yield was calculated considering eq. 1 and the average HER curve shown in FIG. 21. At the potential mentioned above, the $i_{HER}$ current at Pt was 2.72 mA $cm^{-2}$, at Fe-AAPyr was 2.35 mA $cm^{-2}$ and at Fe-MBZ was 2.17 mA $cm^{-2}$. The Faradaic yield for Pt was 4.87 $10^{-3}$ mol $d^{-1}$ $cm^{-2}$ followed by Fe-AAPyr and Fe-MBZ with 4.21 $10^{-3}$ mol $d^{-1}$ $cm^{-2}$ and 3.88 $10^{-3}$ mol $d^{-1}$ $cm^{-2}$. Pt had 15% higher $H_2$ Faradaic yield compared to Fe-AAPyr and 25% higher compared to Fe-MBZ. It also should be mentioned that porous structure of Fe—N—C catalysts is well-suitable for effective de-gassing of the electrode in the conditions close to real electrolyzer ones.

Figure 23A:
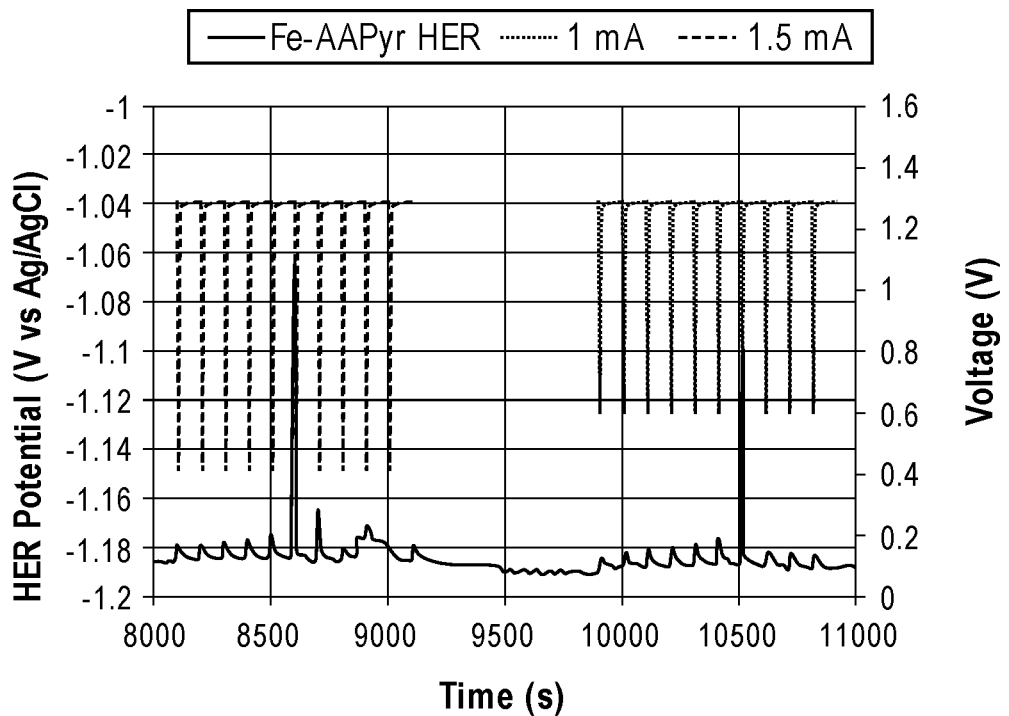
FIG. 23A shows simultaneous hydrogen evolution and discharges curves using Fe-AAPyr as an HER electrode.
Figure 23B:
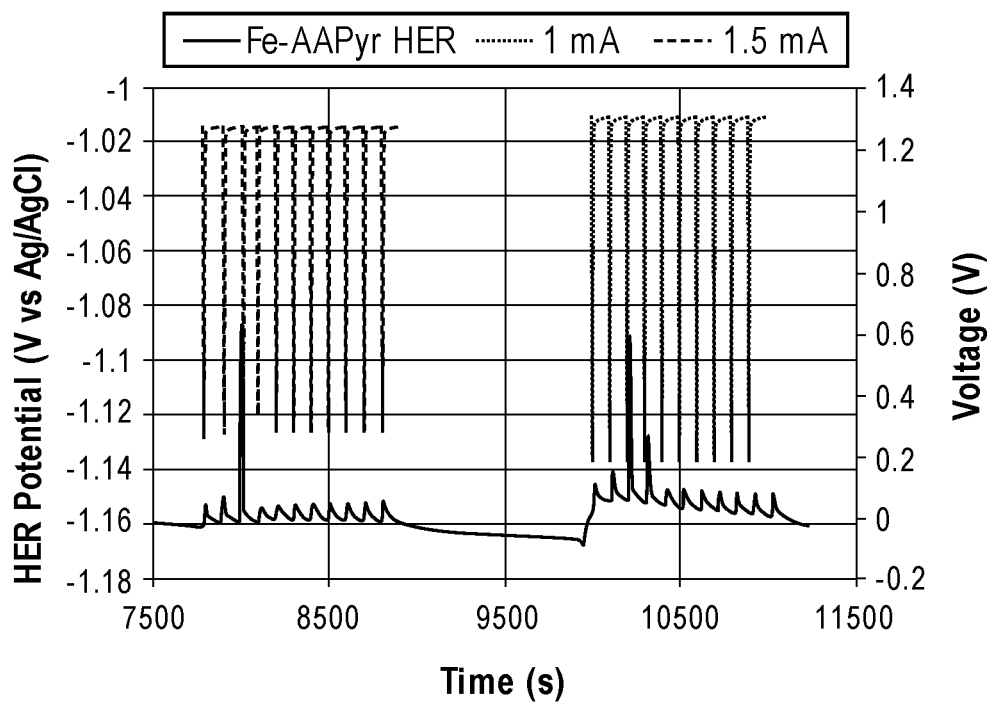
FIG. 23B shows simultaneous hydrogen evolution and discharges curves using), Fe-MBZ as HER electrode.
Figure 23C:
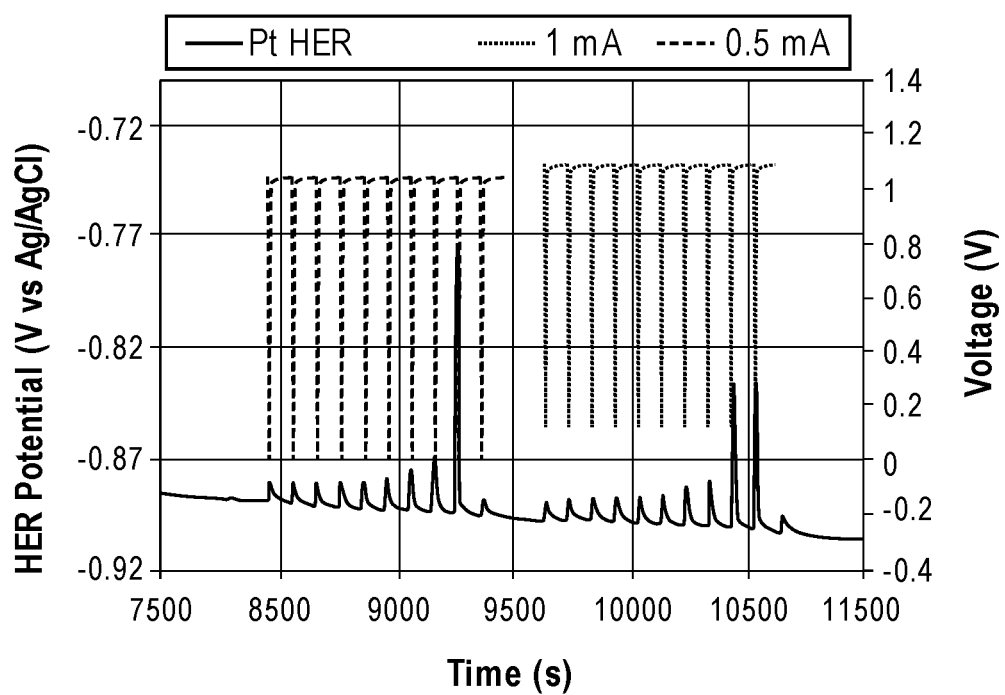
FIG. 23C shows simultaneous hydrogen evolution and discharges curves using Pt as an HER electrode.

FIGS. 23A-23C show simultaneous hydrogen evolution and discharges curves using Fe-AAPyr (FIG. 23A), Fe-MBZ (FIG. 23B) and Pt (FIG. 23C) as HER electrodes. The potential of the $Ad_{HER}$ electrode dramatically decreased, reaching a stable value after 5000 s. Pt stabilized at ≈−0.88V (vs Ag/AgCl) while Fe-AAPyr and Fe-MBZ stabilized at a lower value of ≈−1.17 V (vs Ag/AgCl) and ≈−1.15 V (vs Ag/AgCl), respectively. In the previous paragraph we identified the hydrogen Faradaic yield as 4.87 $10^-$ mol $d^{-1}$ $cm^{-2}$ for Pt, 4.21 $10^{-3}$ mol $d^{-1}$ $cm^{-2}$ for Fe-AAPyr and 3.88 $10^{-3}$ mol $d^{-1}$ $cm^{-2}$ for Fe-MBZ. Additionally in previous experiments, while HER was taking place, 10 discharges were done with $t_{pulse}$ of 2 s and rest time of 100 s using C4 as positive electrode and A1 as negative. During discharge, C4 and A1 surface charges are neutralized by the electron flow through the external circuit (from the anode to the cathode) while ions are released and recombined in the bulk wastewater solution and pulse power is generated. At the same time HER takes place at $Ad_{HER}$. It must be noted that discharges of 1 mA and 1.5 mA were possible when Fe-AAPyr and Fe-MBZ were used as the $Ad_{HER}$. Discharges up to 1 mA were possible when Pt was used as the additional electrode. These experiments show that GLV discharges also affect $Ad_{HER}$ potential which increased slightly but maintained suitable values for hydrogen production. In this configuration, for the first time we show the possibility of producing hydrogen through connected MFCs utilizing an additional HER with the simultaneous production of electric energy. Moreover, for the first time, Fe-AAPyr and Fe-MBZ were used as catalyst for HER in neutral media and had production rates similar to Pt-based HER systems.

What is claimed is:

1. A method for generating power from wastewater comprising:
   providing a supercapacitive bioelectrochemical system (SC-BES) comprising:
      a supercapacitive cell comprising:
         an anode colonized with cultures of electrolytic bacteria;
         a cathode comprising a catalyst;
            wherein the anode and cathode are exposed to the same electrolyte; and
            wherein the anode and cathode act as the negative and positive electrodes of an internal supercapacitor;
         and
      a third, additional electrode (AdE), wherein the AdE is polarized by the cathode or anode, and only active during discharge
   delivering wastewater containing organics to the SC-BES so that the electroactive bacteria are able to oxidize the organics present in the wastewater to produce surface charges and ions;
   storing the surface charges and ions in the internal supercapacitor formed by the anode and cathode; and
   releasing the stored surface charges and ions via a galvanostatic discharge pulse to produce a power output.

2. The method of claim 1 wherein the catalyst is a metal-nitrogen-carbon (M-N—C) material and wherein the metal is selected from the group consisting of Fe, Ni, Co, Mn, Cr, Zn, Cu, Ag, V, Mo, and W.

3. The method of claim 1 wherein the catalyst is based on a metal-X-carbon material and wherein the metal is selected from the group consisting of Fe, Ni, Co, Mn, Cr, Zn, Cu, Ag, V, Mo, and W and X is selected from the group consisting of S, P, B, Al, O, and N.

4. The method of claim 1 wherein the AdE has lower ohmic resistance and higher capacitance than the electrode to which it is polarized and circumvents the ohmic losses of the cathode.

5. The method of claim 1 wherein the SC-BES comprises a plurality of supercapacative cells wherein each cell comprises:
   an anode colonized with cultures of electrolytic bacteria;
   a cathode comprising a catalyst;
      wherein the anode and cathode are exposed to the same electrolyte; and
      wherein the anode and cathode act as the negative and positive electrodes of an internal supercapacitor;
   a water desalination chamber positioned between the anode and cathode and separated from the cathode by an anion exchange membrane and separated from the anode by a cation exchange membrane; and wherein
   at least one cell comprises a third, additional electrode (AdE) short circuited to the cathode and coupled with the anode and positioned between the anion exchange membrane and the cathode, wherein the AdE is only active during discharge.

6. The method of claim 1 wherein the cathode is an air-breathing cathode.

7. The method of claim 6 wherein the air-breathing cathode comprises:
   a first hydrophilic segment facing the electrolyte; and
   a second hydrophobic segment facing the atmosphere.

8. The method of claim 1 wherein the SC-BES is membraneless.

9. The method of claim 1 wherein the SC-BES self-recharges and does not require external charging.

10. The method of claim 9 wherein the self-recharge is reversible.

* * * * *